United States Patent [19]
Mitsuhashi

[11] Patent Number: 5,243,474
[45] Date of Patent: Sep. 7, 1993

[54] AUTOMATIC TRACKING CONTROL SYSTEM WHICH UTILIZES A CROSSTALK ENVELOPE SIGNAL TO VARY A TRACKING CONTROL SIGNAL

[75] Inventor: Yasuo Mitsuhashi, Nagaokakyo, Japan

[73] Assignee: Mitsubishi Denki Kabushiki Kaisha, Tokyo, Japan

[21] Appl. No.: 908,788

[22] Filed: Jul. 6, 1992

Related U.S. Application Data

[63] Continuation of Ser. No. 497,108, Mar. 21, 1990, abandoned.

[30] Foreign Application Priority Data

| Mar. 28, 1989 | [JP] | Japan | 1-77647 |
| Apr. 3, 1989 | [JP] | Japan | 1-85030 |
| Oct. 26, 1989 | [JP] | Japan | 1-281403 |

[51] Int. Cl.[5] .............................................. G11B 21/04
[52] U.S. Cl. .................................. 360/70; 360/77.13; 358/328
[58] Field of Search ................. 360/70, 77.13; 358/328

[56] References Cited

U.S. PATENT DOCUMENTS

| 4,177,481 | 12/1979 | Yamagiwa et al. | 358/328 |
| 4,731,674 | 3/1988 | Fukuda et al. | 358/328 |
| 4,752,843 | 6/1988 | Kim . | |
| 4,812,926 | 3/1989 | Jeon | 360/70 |

FOREIGN PATENT DOCUMENTS

| 0181186 | 5/1986 | European Pat. Off. . |
| 0194445 | 9/1989 | European Pat. Off. . |
| 53-90909 | 8/1978 | Japan . |
| 59-198556 | 11/1984 | Japan . |
| 2068599 | 8/1981 | United Kingdom . |

OTHER PUBLICATIONS

Shiraishi et al., "Video Cassette Recorder Development for Consumers", IEEE Transactions on Consumer Electronics, vol. CE-24, No. 3, Aug. 1978, pp. 468-472.

Primary Examiner—Joseph L. Dixon
Assistant Examiner—David L. Robertson

[57] ABSTRACT

An automatic tracking control system with a servo loop, controlled by a tracking control signal, that adjusts the position of a pickup head in relation to tracks scanned by the head. Adjacent-track crosstalk is extracted by a crosstalk detector and envelope-detected by a crosstalk envelope detector. An automatic tracking control circuit varies the tracking control signal, finds a state that minimizes the crosstalk envelope, and maintains the tracking control signal at or near that state.

For double-deck recording systems in which one signal is recorded in surface tracks over another signal, the automatic tracking control circuit seeks a best compromise between minimizing the crosstalk envelope of one of the signals while maximizing the envelope of the other signal.

36 Claims, 17 Drawing Sheets

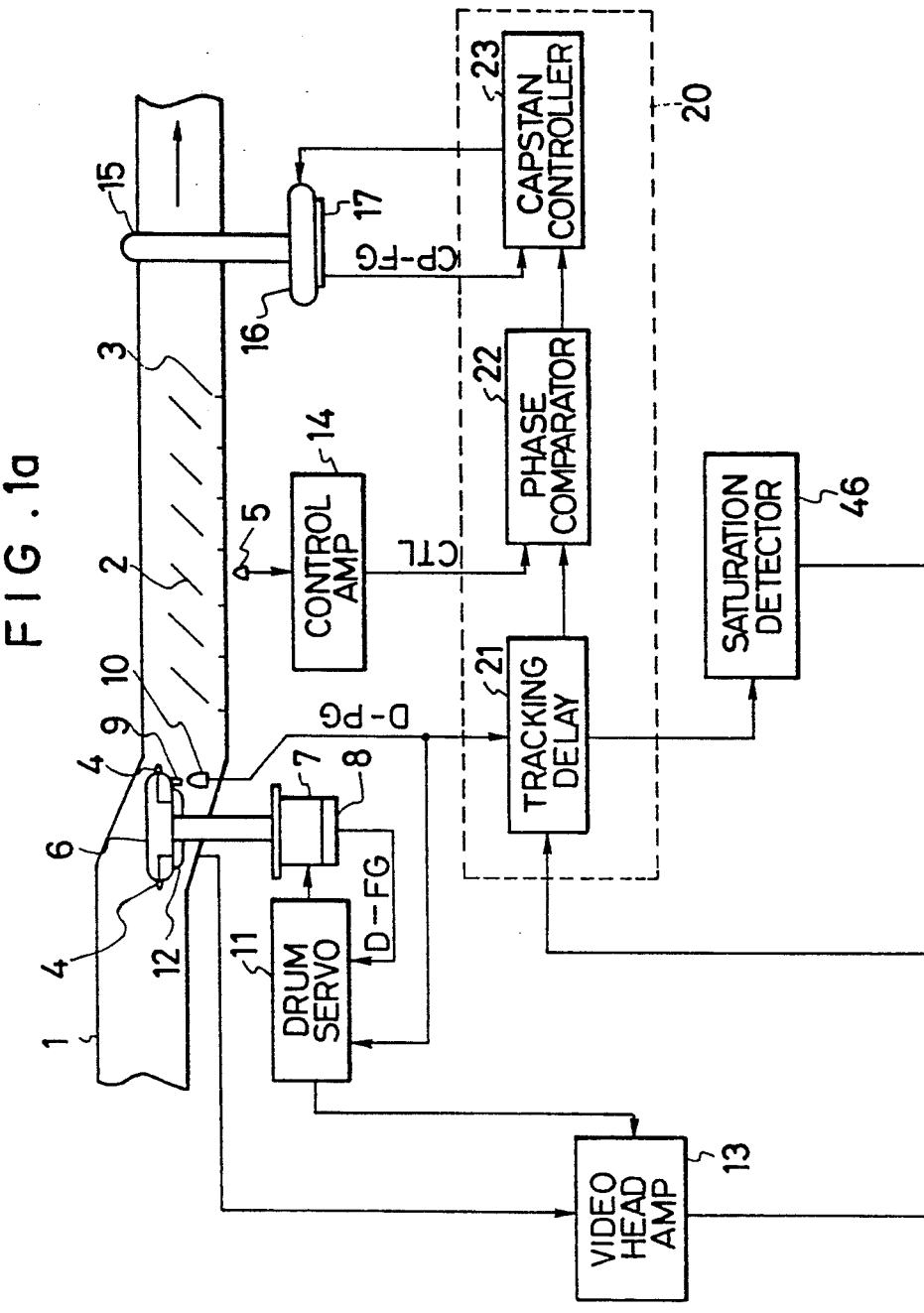

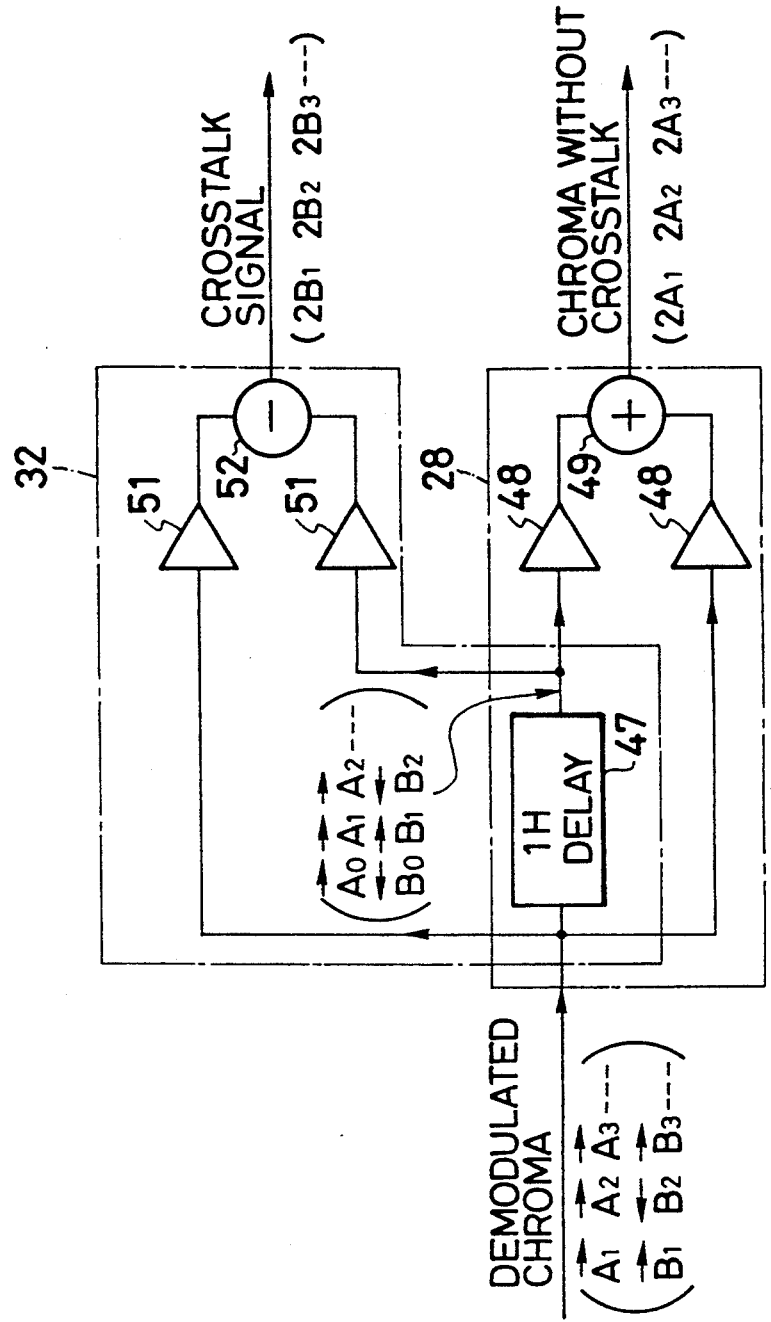

A. TRACKING POSITION

B. CROSSTALK SIGNAL

C. CROSSTALK ENVELOPE & MIN, PEAK

D. COMPARATOR OUTPUT

E. DIFFERENTIATOR OUTPUT

F. FLIP-FLOP OUTPUT

G. TRACKING CONTROL SIGNAL

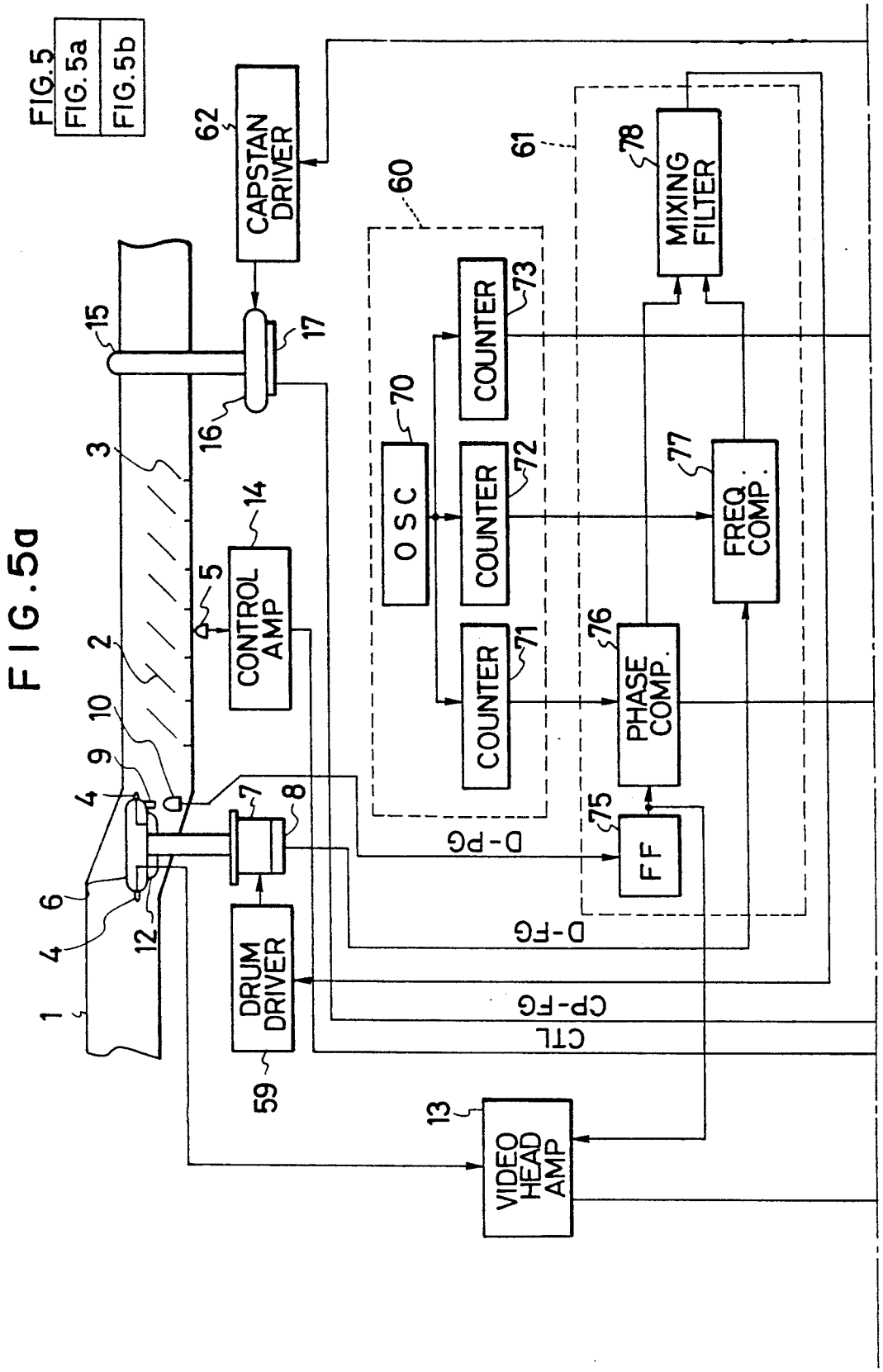

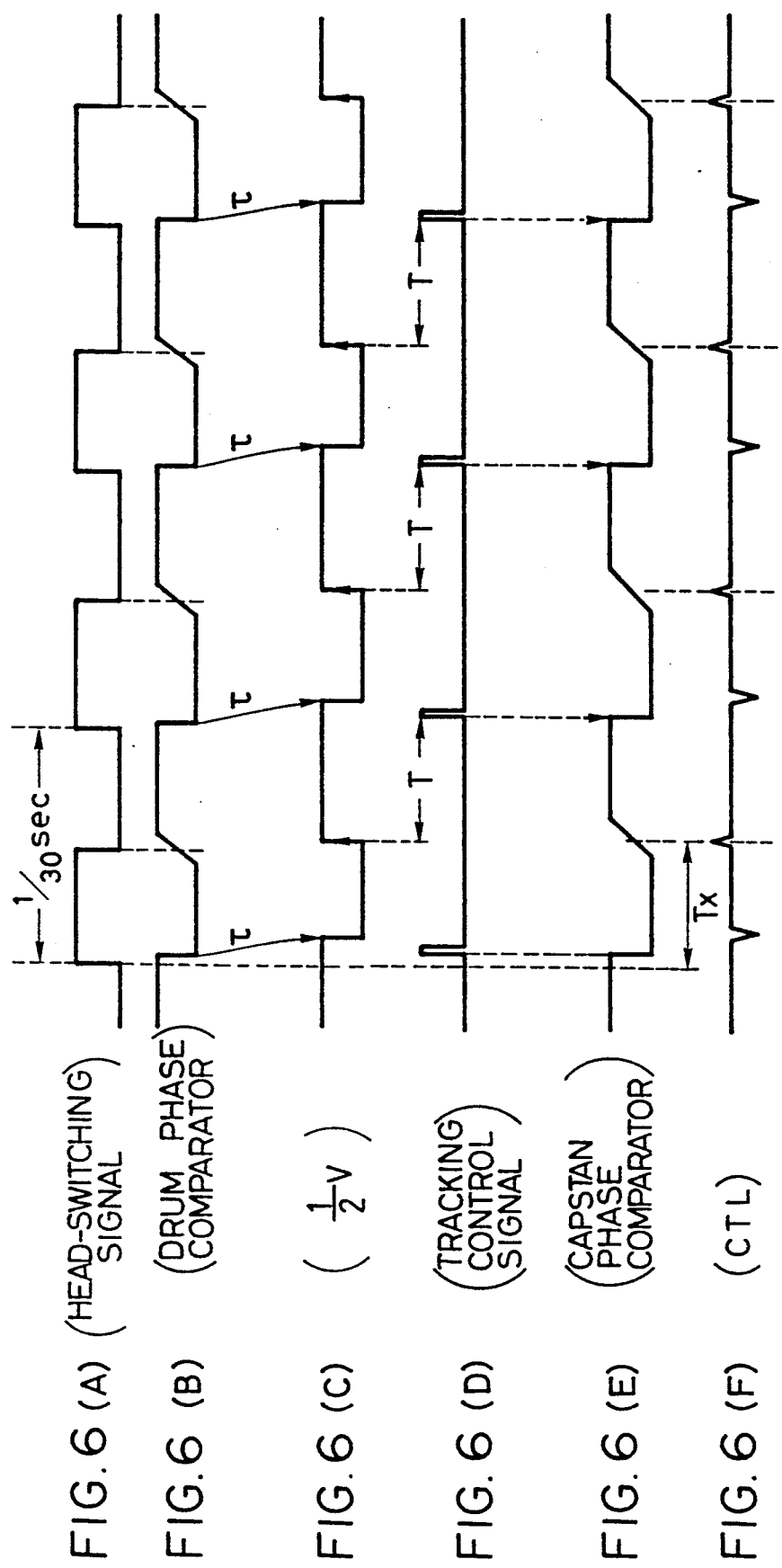

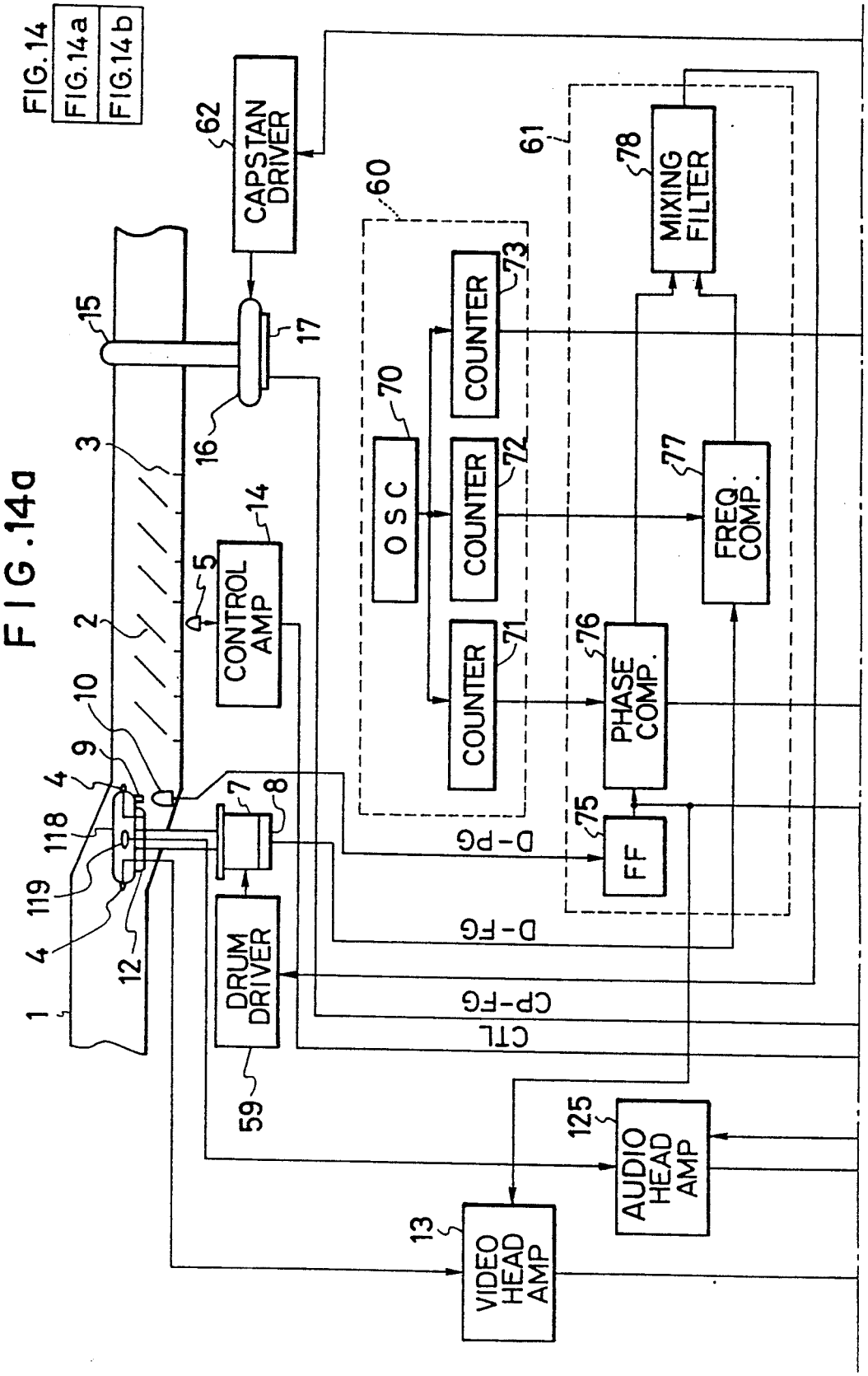

AUTOMATIC TRACKING CONTROL SYSTEM WHICH UTILIZES A CROSSTALK ENVELOPE SIGNAL TO VARY A TRACKING CONTROL SIGNAL

This application is a continuation of application Ser. No. 07/497,108 filed Mar. 21, 1990, now abandoned.

BACKGROUND OF THE INVENTION

This invention relates to an automatic tracking control system for an apparatus that uses one or more pickup heads to reproduce signals recorded on a plurality of mutually adjacent tracks. Examples of such apparatus include video tape recorders (VTRs) and video cassette recorders (VCRs), which reproduce video signals recorded on a magnetic tape.

A VTR or VCR generally comprises two or more video heads that are rotationally driven at high speed while the magnetic tape is transported past them, causing the video heads to scan slanted tracks on the tape. The tape speed is controlled by a servo loop that keeps the heads positioned over the centers of the tracks by establishing a certain tracking delay between a pulse signal representing the rotational position of the heads and a control signal representing the position of the tracks. The tracking delay is controlled by a tracking control signal input to the servo loop. In an automatic tracking control system the tracking control signal is generated by an automatic control circuit that monitors the video signal reproduced by the video heads.

In prior-art automatic tracking control systems the automatic control circuit attempts to maximize the envelope of the output from the video head amplifier. A problem with such automatic tracking control systems is that the video heads pick up not only the signal from the intended track but also crosstalk interference from adjacent tracks, which has a destabilizing effect on automatic tracking, degrading the signal-to-noise ratio of the reproduced video signal.

Crosstalk is particularly troublesome when a tape is recorded on one machine and played back on another machine, a common mode of usage of VCRs. Many VCRs are also built with video heads wider than the video tracks, for special playback modes such as still-or slow-motion in which accurate tracking is not possible, and wide heads further aggravate the crosstalk problem. Due to crosstalk, automatic tracking control systems of the prior-art type have generally proven impractical for VCRs.

SUMMARY OF THE INVENTION

An object of the present invention is accordingly to perform stable, optimal automatic tracking control despite the presence of adjacent-track crosstalk.

An automatic tracking control system comprises a servo loop, responsive to a tracking control signal, for controlling the position of a pickup head with respect to tracks scanned by the pickup head. A crosstalk detector extracts adjacent-track crosstalk from an input signal reproduced by the pickup head, thereby generating a crosstalk signal. A crosstalk envelope detector detects the envelope of the crosstalk signal, thereby generating a crosstalk envelope signal. An automatic tracking control circuit receives the crosstalk envelope signal, varies the tracking control signal, finds a state of the tracking control signal that minimizes the crosstalk envelope signal, and maintains the tracking control signal at substantially that state.

For double-deck recording systems in which one signal is recorded in surface tracks over another signal, the automatic tracking control circuit may be structured so as to minimize the crosstalk envelope of one of the signals while maximizing the envelope of the other signal.

BRIEF DESCRIPTION OF THE DRAWINGS

FIG. 1 comprising FIGS. 1A and 1B is a block diagram of a novel analog automatic tracking control system for a VTR or VCR.

FIG. 3 is a more detailed block diagram of the comb filter and crosstalk detector in FIG. 1.

FIG. 5 comprising FIGS. 5A and 5B is a block diagram of a novel digital automatic tracking control system for a VTR or VCR.

FIGS. 6A-6F are waveform diagrams illustrating the operation of the automatic tracking control system in FIG. 5.

FIG. 14 comprising FIGS. 14A and 14B is a block diagram of a novel digital automatic tracking control system adapted for tracking hi-fi audio-video tapes.

DETAILED DESCRIPTION OF THE INVENTION

Three automatic tracking control systems embodying the present invention will be described with reference to the drawings. All three systems are designed for a VTR or VCR. The pickup head of interest is a video pickup head, referred to simply as a video head below.

In the descriptions, reference will be made to the widely-used VHS recording system in which a video signal is recorded as a frequency-modulated signal in slanted tracks, nominally 58 μm wide, on a magnetic tape. The recorded VHS video signal comprises a chroma component which has been down-shifted to a frequency band of 629 kHz±500 kHz, and a luminance component which occupies a frequency band of 3.4 MHz to 4.4 MHz with sidebands from substantially 1 MHz to substantially 6 MHz. The invention is of course not limited to the VHS system, being equally applicable to other, similar recording systems such as the Beta ® system.

First an analog automatic tracking control system will be described with reference to FIGS. 1 to 4.

Figure 1B:
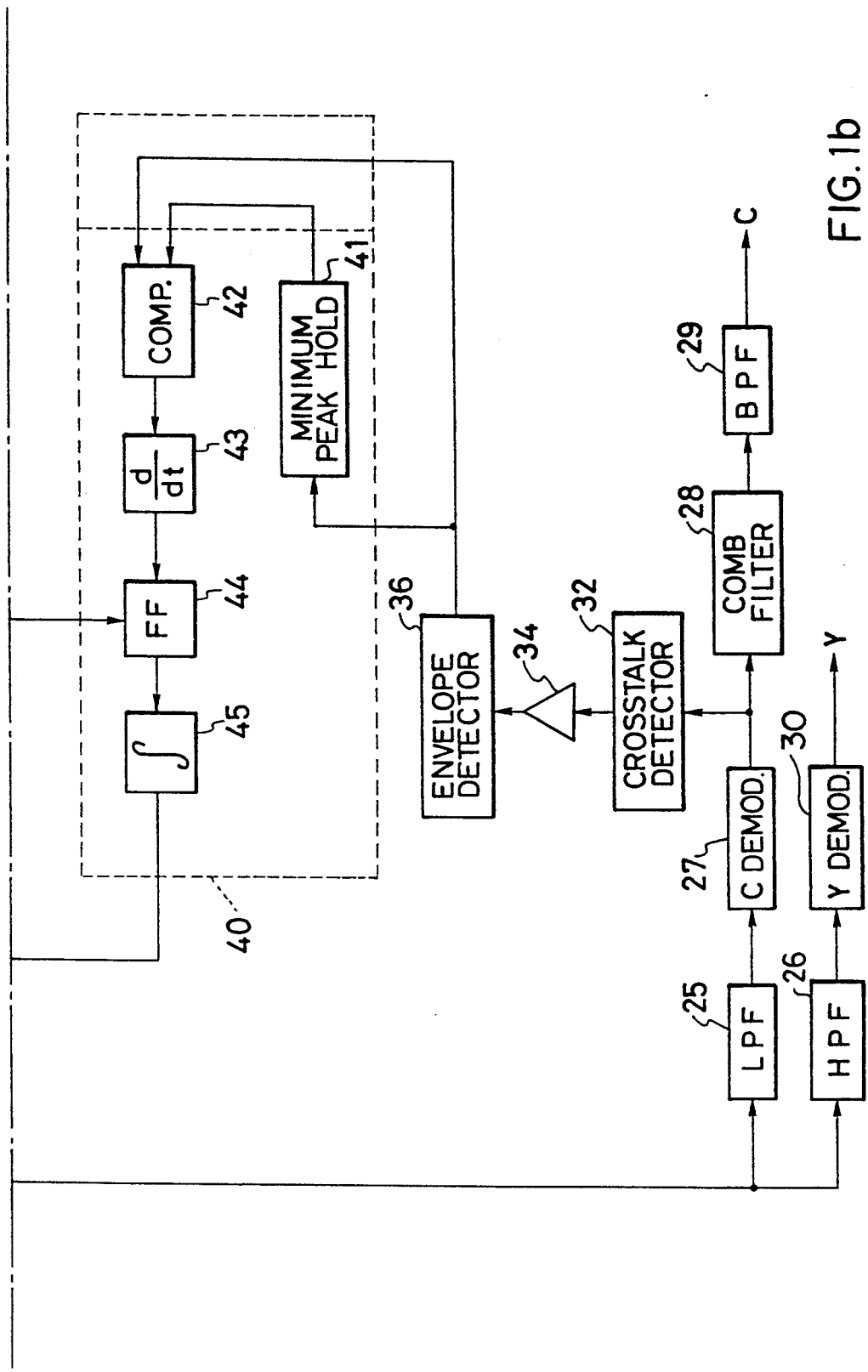

With reference to FIG. 1, video signals are recorded on a magnetic tape 1 in a plurality of mutually adjacent tracks 2 slanted at an angle to the tape axis. Also recorded on the magnetic tape 1 is a control signal 3 indicating the positions of the tracks 2. The video signals recorded on the video tracks 2 are reproduced by a pair of video heads 4. The control signal 3 is reproduced by a stationary control head 5 disposed a certain distance from the video heads 4.

The video heads 4 are mounted 180° apart on a rotary drum 6 around which the magnetic tape 1 is wrapped approximately halfway in a helical configuration. The video heads 4 are mounted with different azimuth angles; that is, they are mounted so that their head gaps are tilted at different angles with respect to the tracks 2. The rotary drum 6 is rotationally driven by a drum motor 7, causing the video heads 4 to scan the tracks 2 on the magnetic tape 1.

A drum frequency generator 8 attached to the drum motor 7 generates a signal denoted D-FG in the drawings with a frequency representing the rotational speed of the drum motor 7. In addition, a pulse generator comprising a magnet 9 mounted on the rotary drum 6 and a stationary pickup coil 10 disposed near the path of the magnet 9 generates a pulse signal, denoted D-PG in the drawings, representing the rotational phase of the rotary drum 6. The D-FG and D-PG signals are provided to a drum servo 11 which sends drive signals to the drum motor 7, thus driving the rotary drum 6 at a controlled speed and phase.

Signals reproduced by the video heads 4 are coupled through a rotary transformer 12 mounted in the rotary drum 6 to a video head amplifier 13, by which they are amplified. The video head amplifier 13 also receives a head-switching signal generated from the D-PG signal by the drum servo 11, causing the video head amplifier 13 to select the video head 4 that is currently scanning the magnetic tape 1.

Control signals reproduced by the control head 5 are amplified by a control amplifier 14, the output of which is denoted CTL in the drawings. The CTL signal is a pulse signal in which each pulse corresponds to one track 2, the pulses having alternate polarity in alternate tracks. One cycle of the the CTL signal thus represents two tracks.

The magnetic tape 1 is held between a capstan 15 and a pinch roller not shown in the drawing. The capstan 15 is rotationally driven by a capstan motor 16, thus transporting the magnetic tape 1 in the direction of the arrow so that the video heads 4 scan successive tracks 2. A capstan frequency generator 17 attached to the capstan motor 16 generates a signal denoted CP-FG with a frequency representing the rotational speed of the capstan motor 16. The CP-FG, D-PG, and CTL signals are supplied to a capstan servo loop 20 that controls the position of the video heads 4 with respect to the tracks 2 in accordance with a tracking control signal described later.

The capstan servo loop 20 comprises a tracking delay circuit 21 which reveives the D-PG pulse signal from the pickup coil 10 and the tracking control signal, delays the D-PG pulses by an amount controlled by the tracking control signal, and outputs the delayed pulses. A phase comparator 22 receives the delayed pulses from the tracking delay circuit 21 and the CTL signal from the control amplifier 14, compares their phase, and generates a phase error signal representing their phase difference. A capstan motor controller 23 receives the phase error signal from the phase comparator 22 and sends drive signals to the capstan motor 16, adjusting the rotational speed of the capstan 15 according to the phase error signal. The capstan servo loop 20 is a negative feedback loop, operating so as to reduce the phase error signal to zero.

To keep the capstan 15 turning at the correct speed as well as the correct phase, the capstan motor controller 23 also compares the CP-FG signal with a reference signal not explicitly indicated in the drawing and drives the capstan motor 16 so that these two signals match in frequency.

The signal reproduced by the video heads 4 and amplified by the video head amplifier 13 is supplied to a low-pass filter 25 that passes frequencies lower than substantially 1 MHz, thereby extracting the down-shifted chrominance component of the video signal, and a high-pass filter (HPF) 26 that passes frequencies higher than substantially 1 MHz, thereby extracting the luminance component. The down-shifted chroma signal from the low-pass filter 25 is passed to a chroma demodulator 27 which restores it to the baseband, centered at a frequency of substantially 3.58 MHz. The baseband chroma signal is supplied to a comb filter 28 which removes adjacent-track crosstalk as will be described later. The output of the comb filter 28 is filtered by a bandpass filter (BPF) 29 with cutoff frequencies at substantially 3.58 MHz±500 kHz. The luminance signal from the high-pass filter 26 is furnished to a luminance demodulator 30. The outputs of the bandpass filter 29 and the luminance demodulator 30 are supplied to further signal processing circuits not shown in the drawing, which reproduce the video picture.

The chroma demodulator 27 also supplies the baseband chroma signal to a crosstalk detector 32, which extracts crosstalk components in the chroma signal, thereby generating a crosstalk signal. The detailed structure of the crosstalk detector 32 and the comb filter 28 will be explained later. The output of the crosstalk detector 32 is amplified by an amplifier 34 and fed to a crosstalk envelope detector 36 which detects the envelope of the crosstalk signal, thereby generating a crosstalk envelope signal. The crosstalk envelope signal is input to an automatic tracking control circuit 40.

The automatic tracking control circuit 40 comprises a minimum peak hold circuit 41 which detects and holds the minimum value of the crosstalk envelope signal, thus generating a minimum peak signal. This minimum peak signal and the crosstalk envelope signal are input to a comparator 42, which subtracts the minimum peak signal from the crosstalk envelope signal and compares the resulting difference with a threshold value. If the difference is less than the threshold, the comparator 42 generates a low voltage output; if the difference exceeds the threshold, the comparator 42 generates a high output. The output of the comparator 42 is differentiated by a differentiator 43, which produces a positive pulse when the comparator output changes from low to high and a negative pulse when the comparator output changes from high to low.

The pulse signal produced by the differentiator 43 is input to a flip-flop 44 which is triggered by pulses of only the positive polarity. The flip-flop 44 produces an output signal the polarity of which reverses whenever the flip-flop is triggered. The flip-flop output signal is integrated by an integrator 45, the output of which is the tracking control signal. The tracking control signal is thus a voltage signal that rises while the output of the flip-flop 44 is positive, and falls while the output of the flip-flop is negative.

This automatic tracking control system also comprises a saturation detector 46, connected to the tracking delay circuit 21 and the flip-flop 44, that detects when the tracking delay circuit 21 reaches its minimum or maximum delay value and generates a signal that reverses the output polarity of the flip-flop 44.

Next the manner in which adjacent-track crosstalk is rejected and detected will be explained, and a more detailed description will be given of the structure of the comb filter 28 and the crosstalk detector 32.

Figure 2A:
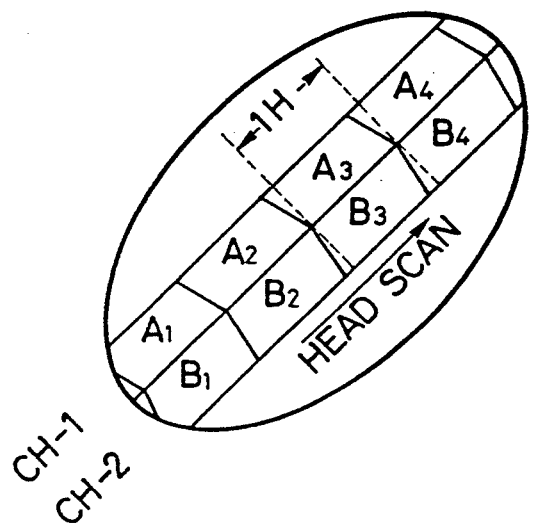
FIGS. 2A-2C are schematic drawings of a pair of adjacent video tracks.
Figure 2B:
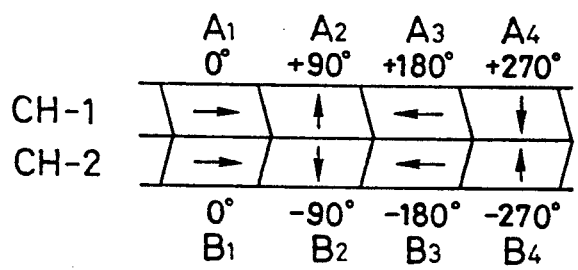
Figure 2C:
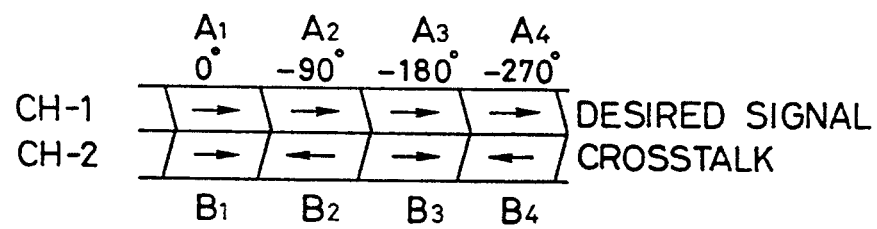

FIG. 2 shows three views of a pair of adjacent tracks 2, referred to below as a channel-one (CH-1) track and a channel-two (CH-2) track. The channel-one track is scanned by one of the two video heads 4, referred to below as the channel-one head; the channel-two track is scanned by the other video head 4, referred to below as the channel-two head. Crosstalk occurs when the channel-one head picks up signals recorded in the channel-two track, or the channel-two head picks up signals recorded in the channel-one track.

The channel-one track comprises segments $A_1$, $A_2$, $A_3$, $A_4$, ... as shown at A in FIG. 2, each segment containing video signal information for one horizontal scanning cycle (1H) in the reproduced picture. The channel-two track similarly comprises 1H segments $B_1$, $B_2$, $B_3$, $B_4$, ... The boundaries between 1H segments in channel one and channel two are shown slanted at different angles, representing the different azimuth angles of the two video heads 4.

Due to the azimuth difference, an azimuth loss occurs when the channel-one head reproduces the channel-two signal or the channel-two head reproduces the channel-one signal. The azimuth loss is proportional to the signal frequency, becoming large enough in the high frequency band occupied by the luminance signal to substantially eliminate crosstalk from the reproduced luminance signal.

To enable crosstalk to be eliminated from the chroma signal, the chroma signal is recorded with a 90° phase advance every 1H in channel one and a 90° phase lag every 1H in channel two, as illustrated at B in FIG. 2. When the chroma signal is demodulated by the chroma demodulator 27, the phase is corrected. When the channel-one signal is demodulated, for example, its phase is delayed by 90° every 1H as illustrated at C in FIG. 2, so that segments $A_1$ to $A_4$ all come out aligned with the same phase angle. In crosstalk picked up from channel two, however, the 90° demodulation phase delay combined with the 90° phase delay with which the signal was recorded causes successive 1H segments to be 180° out of phase, as also illustrated at C in FIG. 2. This phase misalignment is used to detect and reject crosstalk as explained next.

With reference to FIG. 3, the comb filter 28 comprises a 1H delay line 47 for delaying the demodulated chroma signal by 1H, a pair of buffer amplifiers 48 for amplifying the delayed and undelayed chroma signal, and an adder 49 for additively combining the delayed and undelayed chroma signal, thus averaging the chroma signal over adjacent pairs of horizontal lines. Since a video signal changes very little from one line to the next, it is substantially true that $A_n = A_{n+1}$ and $B_n = B_{n+1}$. For channel one for example, since $A_n$ and $A_{n+1}$ are aligned in phase, when additively combined they reinforce each other: $A_n + A_{n+1} = 2A_{n+1}$. Since $B_n$ and $B_{n+1}$ are 180° out of phase, when additively combined they cancel out to substantially zero: $B_n + B_{n+1} = 0$. The two components of the output of the adder 49 are accordingly:

Chroma signal from channel one
$(A_0 + A_1, A_1 + A_2, A_2 + A_3, \ldots) = (2A_1, 2A_2, 2A_3, \ldots)$ Crosstalk from channel two
$(B_0 + B_1, B_1 + B_2, B_2 + B_3, \ldots) = (0, 0, 0, \ldots)$ Thus the comb filter 28 extracts the desired chroma signal and rejects adjacent-track crosstalk.

The crosstalk detector 32 comprises the same 1H delay line 47, a pair of buffer amplifiers 51 for amplifying the delayed and undelayed chroma signal, and a subtractor 52 for subtractively combining the delayed and undelayed chroma signal, thus detecting the difference between successive horizontal lines. The same considerations as above show that, in channel one for example, the output of the subtractor 52 is:

Chroma signal from channel one
$(A_0 - A_1, A_1 - A_2, A_2 - A_3, \ldots) = (0, 0, 0, \ldots)$ Crosstalk from channel two
$(B_0 - B_1, B_1 - B_2, B_2 - B_3, \ldots) = (2B_1, 2B_2, 2B_3, \ldots)$ Thus the crosstalk detector 32 extracts only adjacent-track crosstalk, which it outputs as the crosstalk signal.

Next the operation of the automatic tracking control system in FIG. 1 will be described in detail.

By comparing the D-FG and CP-FG signals with reference signals not shown in the drawing, the drum servo 11 and capstan controller 23 drive the rotary drum 6 and magnetic tape 1 at fixed speeds such that the D-PG and CTL signals have the same frequency of 30 Hz; thus the rotary drum 6 makes one complete turn as two tracks 2 are carried past it, allowing each track to be scanned by one video head 4. The positional relationship between the video heads 4 and the tracks 2 corresponds to the phase relationship between the D-PG and CTL signals. By keeping the phase error signal from the phase comparator 22 near zero, the capstan servo loop 20 holds the phase relationship between the D-PG and CTL signals at a value that depends on the delay introduced by the tracking delay circuit 21.

Figure 4:
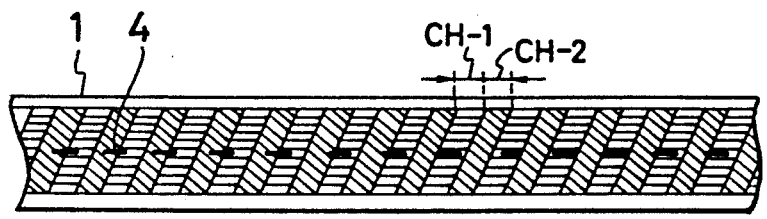
FIGS. 4A-4G are waveform diagrams illustrating the operation of the automatic tracking control system in FIG. 1.
Figure 4:
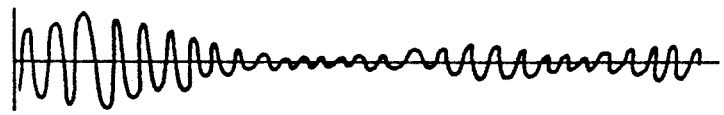
Figure 4:
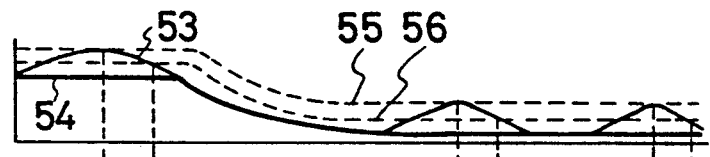
Figure 4:
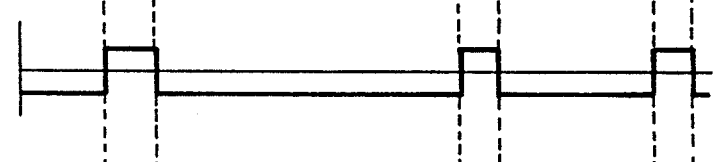
Figure 4:
Figure 4:
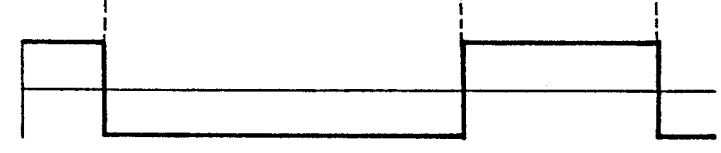
Figure 4:
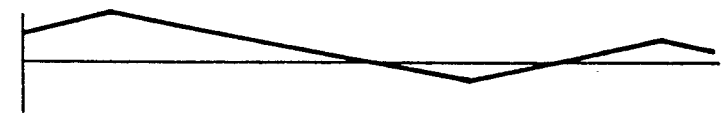

With reference to FIG. 4, during playback the positional relationship between the video heads 4 and tracks 2 may vary as illustrated at A, which shows the position of the channel-one head 4 in scans of successive channel-one tracks. The signal picked up by the video heads 4 is filtered by the low-pass filter 25 and demodulated by the chroma demodulator 27, and a crosstalk signal is extracted by the crosstalk detector 32 as already explained. The crosstalk signal output by the crosstalk detector 32 is illustrated at B in FIG. 4, showing how the amount of crosstalk varies in relation to the tracking position of the video heads 4.

The crosstalk signal is amplified by the amplifier 34 and input to the crosstalk envelope detector 36, which generates the crosstalk envelope signal, indicated by the curve 53 at C in FIG. 4. When playback begins, the initial value of the crosstalk envelope is held by the minimum peak hold circuit 41, as indicated by the line 54 at C in FIG. 4. The crosstalk envelope signal and minimum peak signal input to the comparator 42 being initially equal, their difference (zero) is initially less than the comparator threshold value, indicated by the dashed line 55, so the output of the comparator 42 is initially low, as shown at D in FIG. 4. The flip-flop 44 is initially in, for example, the positive output state as shown at F. The positive output of the flip-flop 44 is integrated by the integrator 45, which thus generates an initially increasing tracking control signal as shown at G.

This increasing tracking control signal G is input to the tracking delay circuit 21, causing it to vary the delay of the D-PG signal. The capstan servo looo 20 accordingly alters the positional relationship of the tracks 2 and the video heads 4. If this alteration happens to be in the wrong direction, away from the optimal tracking position, then crosstalk increases, causing the crosstalk envelope signal to rise as illustrated in FIG. 4.

When the difference between the crosstalk envelope signal and the original value held by the minimum peak hold circuit 41 exceeds the threshold 55 of the comparator 42, the comparator 42 output D changes from low to high and the differentiator 43 generates a positive pulse as shown at E in FIG. 4, triggering the flip-flop 44. The output F of the flip-flop 44 then reverses from positive to negative and the tracking control signal G output by the integrator 45 begins to decrease, causing the capstan servo loop 20 to start shifting the positional relationship of the tracks 2 and the video heads 4 in the desired direction toward the optimal tracking position. The automatic tracking control circuit 40 will now continue to vary the tracking control signal in one direction until the crosstalk envelope signal reaches its minimum value.

As the capstan servo loop 20 moves toward the optimal tracking position, crosstalk decreases and the comparator 42 reverts from high to low output. For stable operation, the high-to-low transition threshold 56 of the comparator 42 is preferably lower than the low-to-high transition threshold 55. The high-to-low transition causes the differentiator 43 to generate a negative pulse, but this does not trigger the flip-flop 44, so the automatic tracking control circuit 40 continues to reduce the tracking control signal G.

When the crosstalk envelope falls below its original value, the output of the minimum peak hold circuit 41 begins to fall too and the two signals decrease together as shown at C in FIG. 4 until the optimum tracking position, with minimum crosstalk, is reached. The state of the tracking control signal G that minimizes the crosstalk envelope signal has now been found. Thereafter, the minimum peak hold circuit 41 continues to hold this minimum crosstalk envelope value.

Since the output of the flip-flop 44 remains negative at this point, the tracking control signal G continues to decrease, the capstan servo loop 20 moves past the optimum tracking position, and the crosstalk envelope signal begins to rise again. When the difference between the crosstalk envelope signal and the minimum value held by the minimum peak hold circuit 41 exceeds the threshold 55, however, the output of the comparator 42 goes high, the differentiator 43 generates a positive pulse, and the output polarity of the flip-flop 44 reverses again, thus reversing the direction of change of the tracking control signal F and sending the capstan servo loop 20 back toward the optimum tracking position.

Thereafter, the automatic tracking control circuit 40 continues to operate in this way, reversing the direction of change of the tracking control signal G each time the crosstalk envelope signal upwardly passes the threshold 55 in relation to the minimum value held by the minimum peak hold circuit 41, thus keeping the tracking control signal G at a value substantially equal to the value that minimizes the crosstalk envelope signal.

If during this operation the automatic tracking control circuit 40 attempts to move the tracking control signal G outside the variable range of the tracking delay circuit 21, the saturation detector 46 sends it back in the other direction. This prevents the servo loop from getting stuck at one end of the variable range and never reaching the optimum tracking position.

Next an automatic tracking control system having digital servo loops will be described.

Figure 5B:
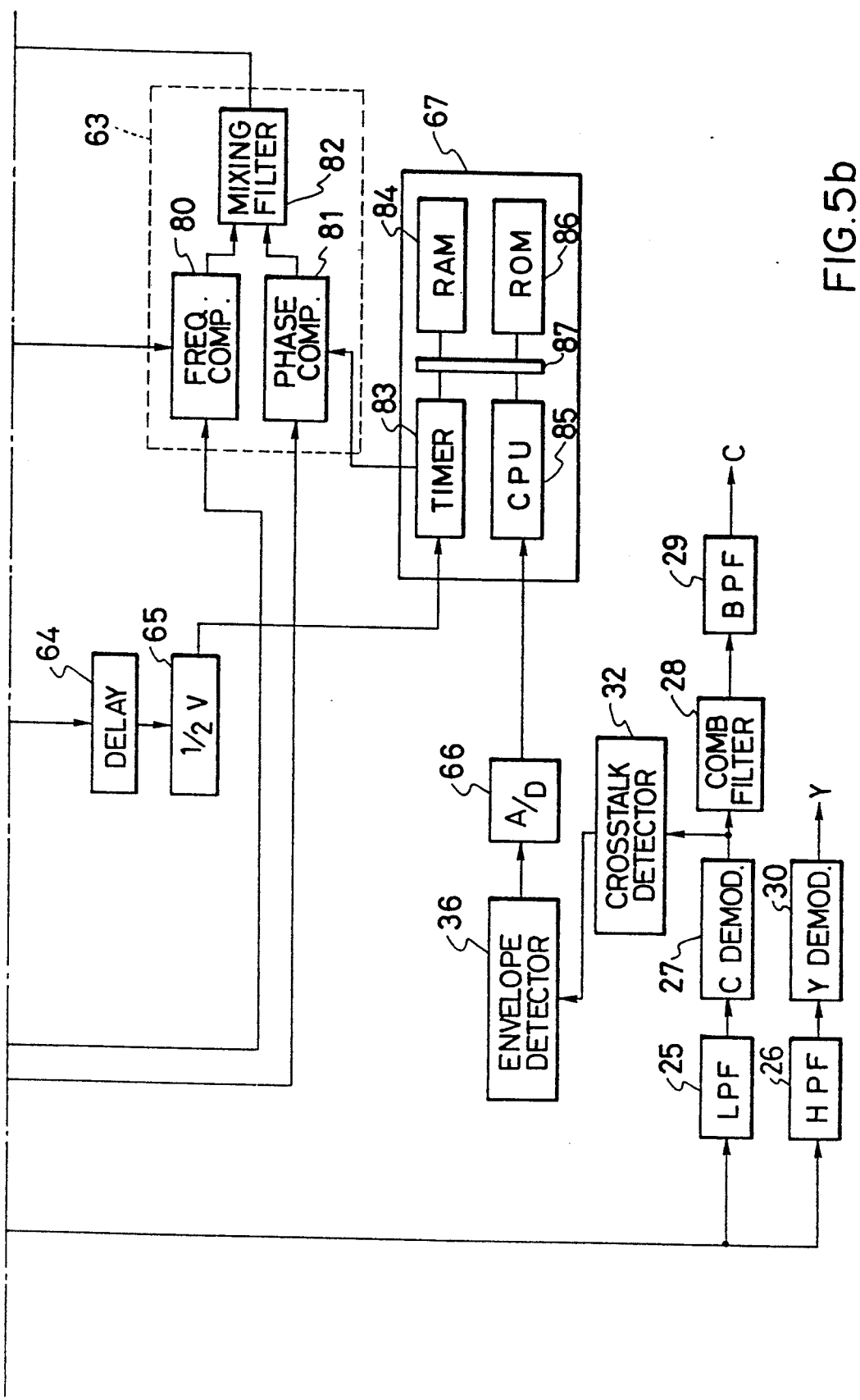

With reference to FIG. 5, elements 1 to 10, 12 to 17, and 25 to 30 are the same as in FIG. 1. The crosstalk detector 32 and envelope detector 36 are also the same as in FIG. 1. The drum servo comprises a drum motor driver 59, a reference signal generator 60, and a drum servo control circuit 61. The capstan servo loop comprises a capstan motor driver 62, the reference signal generator 60, and a capstan servo control circuit 63. The automatic tracking control circuit comprises a delay line 64, a $\frac{1}{2}$-V reference signal generator 65, an A/D converter 66, and a microcomputer 67. The microcomputer 67 generates the tracking control signal, which in this case is a pulse signal.

The reference signal generator 60 comprises an oscillator 70 for generating clock pulses at a constant frequency such as 3.58 MHz, and down-counters 71, 72, and 73. Starting from predetermined initial values, the down-counters 71, 72, and 73 count clock pulses from the oscillator 70, generating pulse outputs at certain predetermined intermediate values. When their counts reach zero, the down-counters 71, 72, and 73 return to their initial values and start counting down again, thus generating reference signals at frequencies lower than the oscillator frequency.

The drum servo control circuit 61 locks the phase and frequency of rotation of the rotary drum 6 according to the phase of the reference signal generated by the down-counter 71 and the frequency of the reference signal generated by the down-counter 72. Specifically, the drum servo control circuit 61 comprises a drum flip-flop 75, a drum phase comparator 76, a drum frequency comparator 77, and a mixing filter 78. The drum flip-flop 75 receives D-PG pulses from the pickup coil 10 and generates a head-switching signal that is sent to both the video head amplifier 13 and the drum phase comparator 76. The drum phase comparator 76 compares the phase of the head-switching signal with the phase of the reference signal received from the down-counter 71, and generates an error signal representing the phase difference. The drum frequency comparator 77 compares the frequency of the D-FG signal from the drum frequency generator 8 with the frequency of the reference signal from the down-counter 72, and generates an error signal representing the frequency difference. The mixing filter 78 mixes and smoothes these two error signals and generates a combined error signal that controls the drum motor driver 59, which drives the drum motor 7. The drum servo loop employs negative feedback to hold the combined error signal to zero.

The operation of the drum servo loop is partly illustrated at the top of FIG. 6. Signal A in FIG. 6 is the head-switching signal generated by the drum flip-flop 75. Signal B is generated in the drum phase comparator 76 by gating the output of a linear voltage-ramp generator according to pulses from the down-counter 71, thus causing signal B to rise in a linear ramp during a certain count interval and reset at a later count. Signal B is sampled on the falling edge of the head-switching signal A, the sampled voltage becoming the output of the drum phase comparator 76 to the mixing filter 78. The servo loop is adapted to bring the falling edge of the head-switching signal A to the center of the ramp in signal B.

With reference again to FIG. 5, the capstan servo control circuit 62 operates similarly to lock the rotation of the capstan 15 according to the frequency of the reference signal generated by the down-counter 73 and the phase of the tracking control signal generated by the microcomputer 67. The capstan servo control circuit 62 comprises a capstan frequency comparator 80 that compares the CP-FG signal from the capstan frequency generator 17 with the reference signal from the down-counter 73 and generates a frequency error signal, a capstan phase comparator 81 that compares the CTL signal from the control amplifier 14 with the tracking control signal and generates a phase error signal, and a mixing filter 82 that mixes and smoothes these two error signals to create a combined error signal that controls the capstan motor driver 62, operating so as to reduce the combined error signal to zero.

The drum phase comparator 76 sends a signal indicating the falling edge of the signal B in FIG. 6 to the delay line 64 in FIG. 5, which delays this signal by a certain amount $\tau$ and sends it to the $\frac{1}{2}$-V reference signal generator 65. The $\frac{1}{2}$-V reference signal generator 65 generates a $\frac{1}{2}$-V reference signal having a frequency of 30 Hz (half the vertical sync frequency) and a falling edge delayed by $\tau$ from the falling edge of signal B. Being related in this way to signal B, which is derived from the head-switching signal, which is derived from the D-PG signal, the $\frac{1}{2}$-V reference signal represents the rotational position of the video heads 4. The $\frac{1}{2}$-V reference signal is shown at C in FIG. 6.

The microcomputer 67 receives the $\frac{1}{2}$-V reference signal from the $\frac{1}{2}$-V reference signal generator 65, and generates a tracking control signal, shown at D in FIG. 6, comprising pulses which have the same frequency as the $\frac{1}{2}$-V signal but differ in phase by a parameter T, referred to below as the tracking phase parameter. Input to the capstan phase comparator 81, these tracking control pulses trigger a gated ramp signal shown at E in FIG. 6, similar to the gated ramp signal B in the drum phase comparator 76. The capstan servo loop adjusts the rotation of the capstan motor 16 so that positive control pulses from the control amplifier 14, shown at F in FIG. 6, come at the center of the ramp, thus establishing a phase delay Tx between the CTL signal and the head-switching signal.

The A/D converter 66 receives the crosstalk envelope signal from the crosstalk envelope detector 36 and converts it to a digital envelope signal, the value of which will be denoted L below. The microcomputer 67 receives the digital envelope signal from the A/D converter 66 and uses it to determine the tracking phase parameter T as explained next.

The microcomputer 67, which may be an inexpensive single-chip microcomputer, comprises a timer 83, a random-access memory (RAM) 84, a central processing unit (CPU) 85, and a read-only memory (ROM) 86 interconnected by an internal bus 87. The timer 83 is triggered by the rising edge of the $\frac{1}{2}$-V reference signal, runs for the time T, then outputs a tracking control pulse. The tracking phase T is controlled by a value set in a register in the timer 83, which can be modified by the central processing unit 85. The random-access memory 84 stores threshold values J which the central processing unit 85 calculates by adding a tolerance value P to values of the digital envelope signal L received from the A/D converter 66.

The read-only memory 86 stores a program that, when executed by the central processing unit 85, causes it to vary the tracking phase parameter T in accordance with a search algorithm. The central processing unit 85 compares the digital envelope value L with the stored threshold value J, selects values of T at which the digital envelope exceeds the threshold as setting values, and stores these setting values in the random-access memory 84. After setting values have been found, the central processing unit 85 calculates from them a target tracking phase that will substantially minimize the digital envelope signal L, and sets the tracking phase parameter T to this target tracking phase. The timer 83 then continues to generate tracking control pulses at the target tracking phase.

A specific search algorithm will be described next. The basic plan of the search algorithm is to alter the tracking phase T by small steps, searching in decreasing and increasing directions until two setting values are found at which the crosstalk envelope L exceeds the threshold J. The tracking phase is then moved to a value midway between the two setting values. The threshold J is ideally equal to the minimum crosstalk envelope value plus the tolerance P. If during the search it turns out that the threshold is too high (J>L+P), then the threshold is lowered to L+P.

Figure 7:
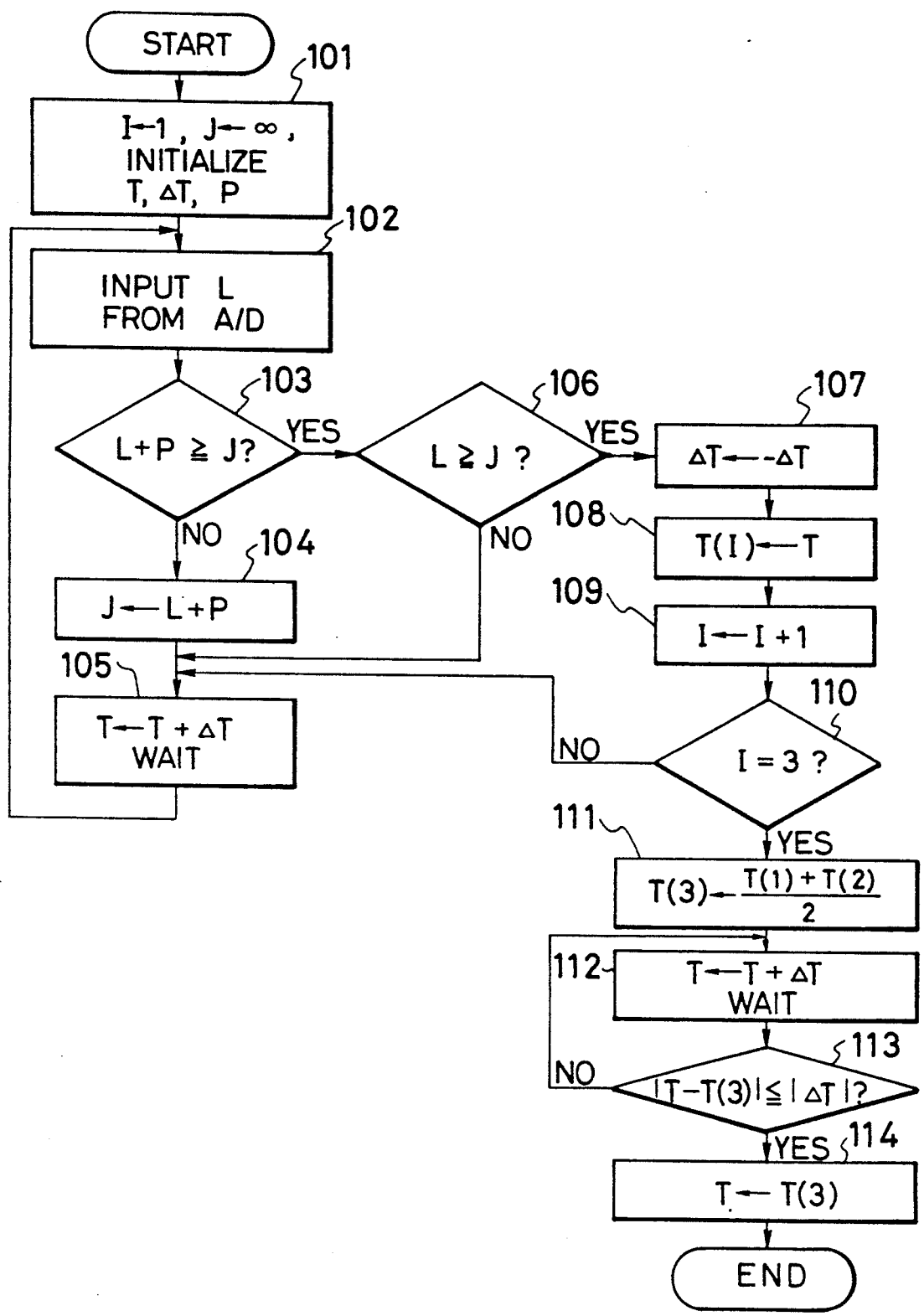
FIG. 7 is a flowchart of the search algorithm executed by the microcomputer in FIG. 5.

The search algorithm is shown in flowchart form in FIG. 7. First an index parameter I is initialized to the value one and the threshold J is initialized to a very large value, such as the largest value the microcomputer 67 is capable of representing, denoted conventionally by an infinity symbol in the drawing (step 101). In addition, initial values are assigned to the tracking phase parameter T and an increment-decrement parameter $\Delta T$, and the tolerance parameter P is set.

The search algorithm now follows a loop. The microcomputer 67 inputs the current crosstalk envelope value L from the A/D converter 66 (step 102). The central processing unit 85 adds P to L and compares the results with the threshold J (step 103). If $$L+P<J$$

then J is reduced to L+P (step 104) and the tracking phase parameter T is altered to $T+\Delta T$ (step 105). After a suitable wait, during which the timer 83 generates tracking control signals at the new tracking phase and the capstan servo loop settles into this new phase, the algorithm returns to step 102, inputs a new crosstalk envelope value, and repeats the same process.

In step 103, if $$L+P \geq J$$

then L is compared with J (step 106). If $$L<J$$

then the crosstalk envelope is still below threshold, so the algorithm returns to step 105. If, however, $L \geq J$ then a setting value has been found. The sign of the increment-decrement parameter $\Delta T$ is now reversed (step 107), the current tracking phase T is stored in the random-access memory 84 as a setting value T(I) (step 108) and the index parameter I is incremented (step 109). Next I is compared with a terminating value of three (step 110). If $I < 3$ then the algorithm returns to step 105. If, however, $I = 3$ then the search in both directions has been completed, so the central processing unit 85 computes the target tracking phase T(3) by averaging the stored setting values T(1) and T(2) (step 111). The tracking phase T is then adjusted (step 112) until the absolute difference between T and the target tracking phase T(3) is less than the absolute value of $\Delta T$ (step 113). Finally, the tracking phase T is set to T(3) (step 114).

Figure 8:
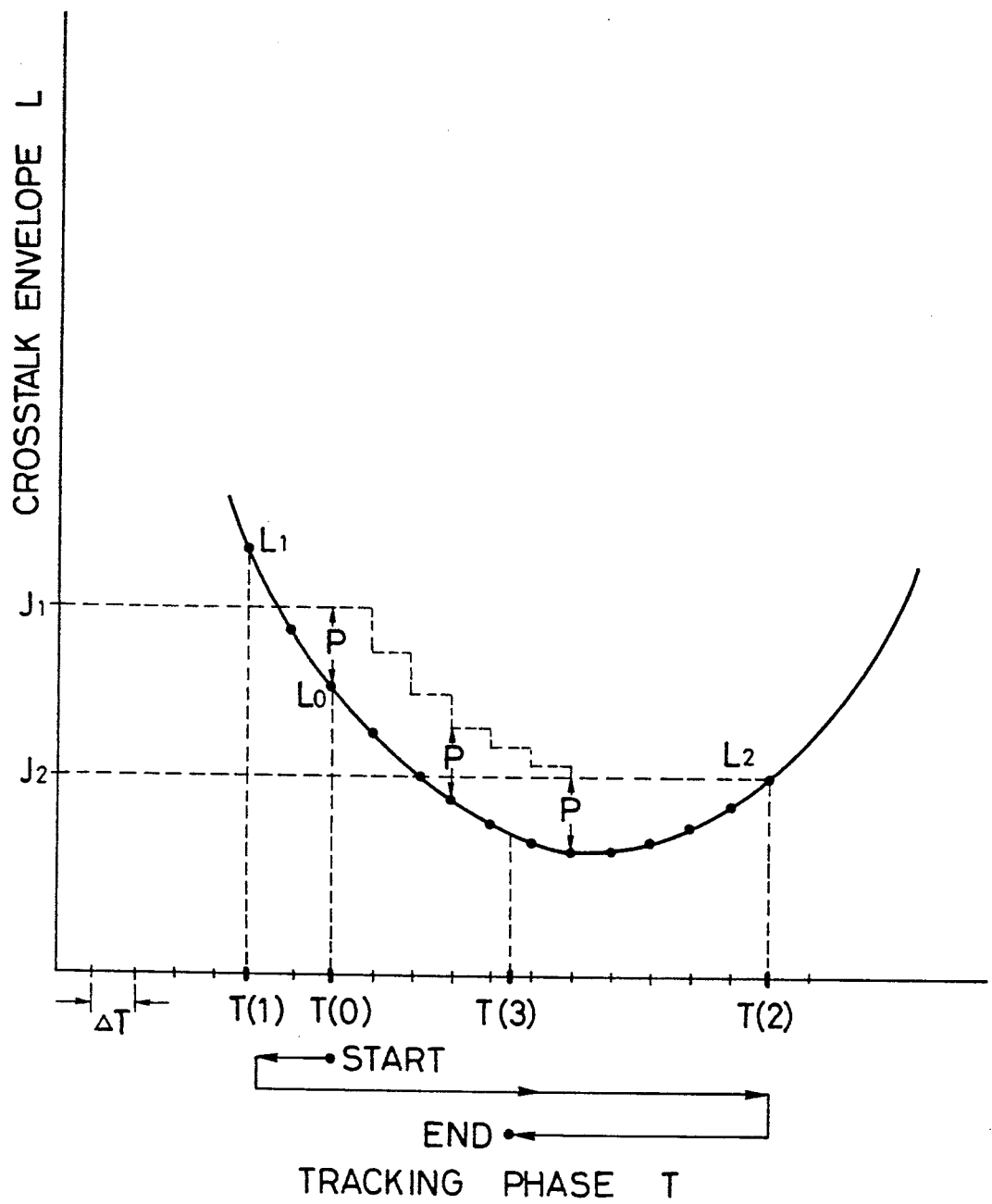
FIG. 8 is a tracking characteristic plot illustrating the operation of the automatic tracking control system in FIG. 5.

The operation of the search algorithm is illustrated in FIG. 8, which shows the crosstalk envelope value L on the vertical axis and the tracking phase parameter T on the horizontal axis. The search starts from the an initial tracking phase denoted T(0) at which the crosstalk envelope value is $L_0$, and the initial value of the increment-decrement parameter is negative. In the first iteration of the algorithm, the threshold is reduced from its large initial value to $L_0 + P = J_1$. Next, T is stepped $\Delta T$ at a time in the negative direction (to the left in the drawing) until the crosstalk envelope reaches a value $L_1$ equal to or greater than $J_1$, at which point the value of T is stored as the first setting point T(1).

T is now stepped in the positive direction (to the right in the drawing) to search for the second setting value. In the course of this search, as T moves to the right of T(0) the threshold is further reduced, ultimately to a value $J_2$ substantially P higher than the minimum value on the crosstalk envelope curve. The search continues until the crosstalk envelope reaches a value $L_2$ equal to or greater than $J_2$, and the corresponding value of T is stored as the second setting point T(2). T is then stepped in the negative direction again toward the midpoint T(3) between T(1) and T(2), and finally set equal to T(3).

In this example, since the starting point T(0) was on the negative side of the minimum value of the crosstalk envelope curve and the initial increment-decrement value was also negative, the threshold $J_1$ used to identify the first setting point was somewhat higher than the threshold $J_2$ used to identify the second setting point, causing the target tracking phase T(3) to be set slightly to the left of the optimum point. The search algorithm can be modified in various obvious ways to avoid this. After the second search, for example, the direction can be reversed again, a third search can be made, and the target tracking phase can be set midway between the second and third setting values. In FIG. 7 this can conveniently be done by initializing the index parameter I to zero instead of one. Alternatively, a third search can be made only if the difference between the first threshold $J_1$ and second threshold $J_2$ exceeds a certain amount.

The search algorithm may also contain steps to be taken if no setting value can be found in the positive or negative direction. For example, after a search has been made in both directions, if either search is unsuccessful, a new search can be made to find a target tracking phase at which the crosstalk envelope value L plus the tolerance parameter P substantially equals the threshold value J.

The program stored in the read-only memory 86 preferably contains an additional routine, executed after the tracking phase parameter T has been set to the target tracking phase T(3), for monitoring the crosstalk envelope and repeating the same search procedure to correct the tracking if the crosstalk envelope value rises above a certain threshold, such as $J_2$.

Figure 9:
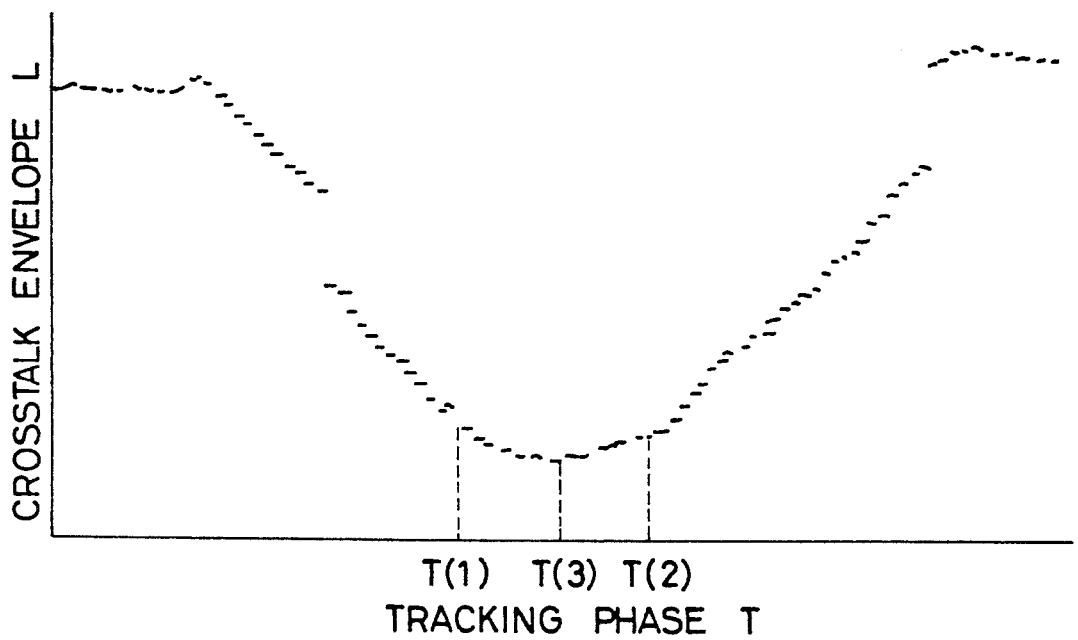
FIG. 9 is a tracking characteristic plot illustrating the performance of the automatic tracking control system in FIG. 5.

FIG. 9 shows an example of the performance of the digital automatic tracking control system in FIG. 5. The tracking phase T is shown on the horizontal axis, and the crosstalk envelope value L on the vertical axis. The target tracking phase T(3) is set very close to the optimum value, resulting in maximum pick-up of the intended signal with minimum adjacent-track crosstalk, so the reproduced signal has an excellent signal-to-noise ratio.

Next a third automatic tracking control system will be described, adapted for use in a hi-fi VCR employing a double-deck recording system such as the VHS hi-fi system, in which audio and video signals are recorded in tracks of different depths in the magnetic tape and scanned by heads mounted in the same rotary drum.

First the double-deck recording system will be explained with reference to FIGS. 10 to 13.

Figure 10:
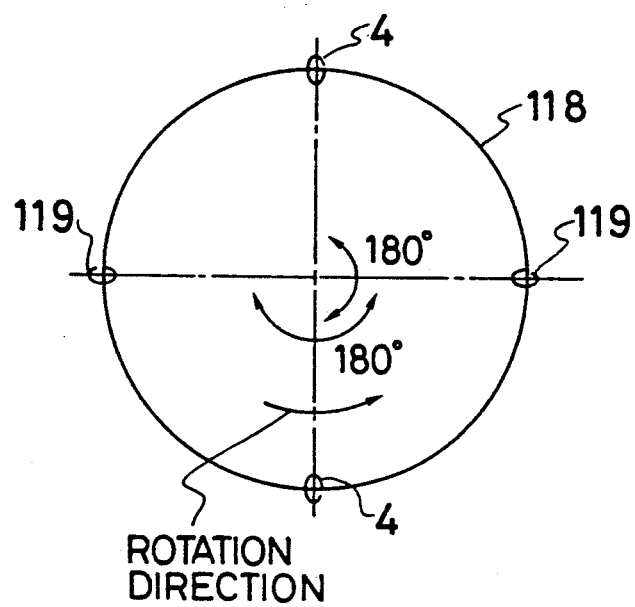
FIG. 10 is a plan view of a rotary drum for playing hi-fi audio-video tapes.

FIG. 10 is a plan view of the rotary drum 118, which comprises a pair of video heads 4 and a pair of audio heads 119. The heads are spaced at 90° intervals, the two video heads 4 being mutually opposite and the audio heads 119 also mutually opposite.

Figure 11:
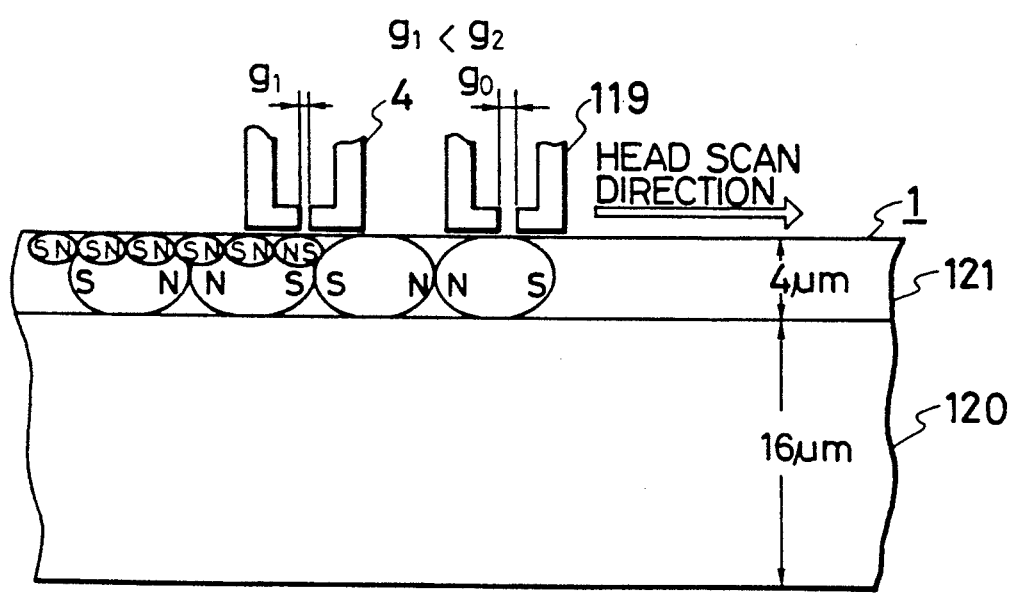
FIG. 11 is a sectional view of a hi-fi audio-video tape, illustrating double-deck recording of audio and video signals.

With reference to the sectional view in FIG. 11, the magnetic tape 1 comprises a base film 120 substantially 16 $\mu$m thick and a magnetic coating 121 substantially 4 $\mu$m thick. The video heads 4 have a relatively narrow head gap $g_1$, causing them to record and reproduce signals in first tracks disposed in the surface layer of the magnetic coating 121. The audio heads 119 have a relatively wide head gap $g_2$, causing them to record and reproduce signals in second tracks extending the full depth of the magnetic coating 121. In recording, as the heads scan the tape the audio signal is recorded in these second tracks, and the video signal is recorded in first tracks on top of the audio signal.

Figure 12:
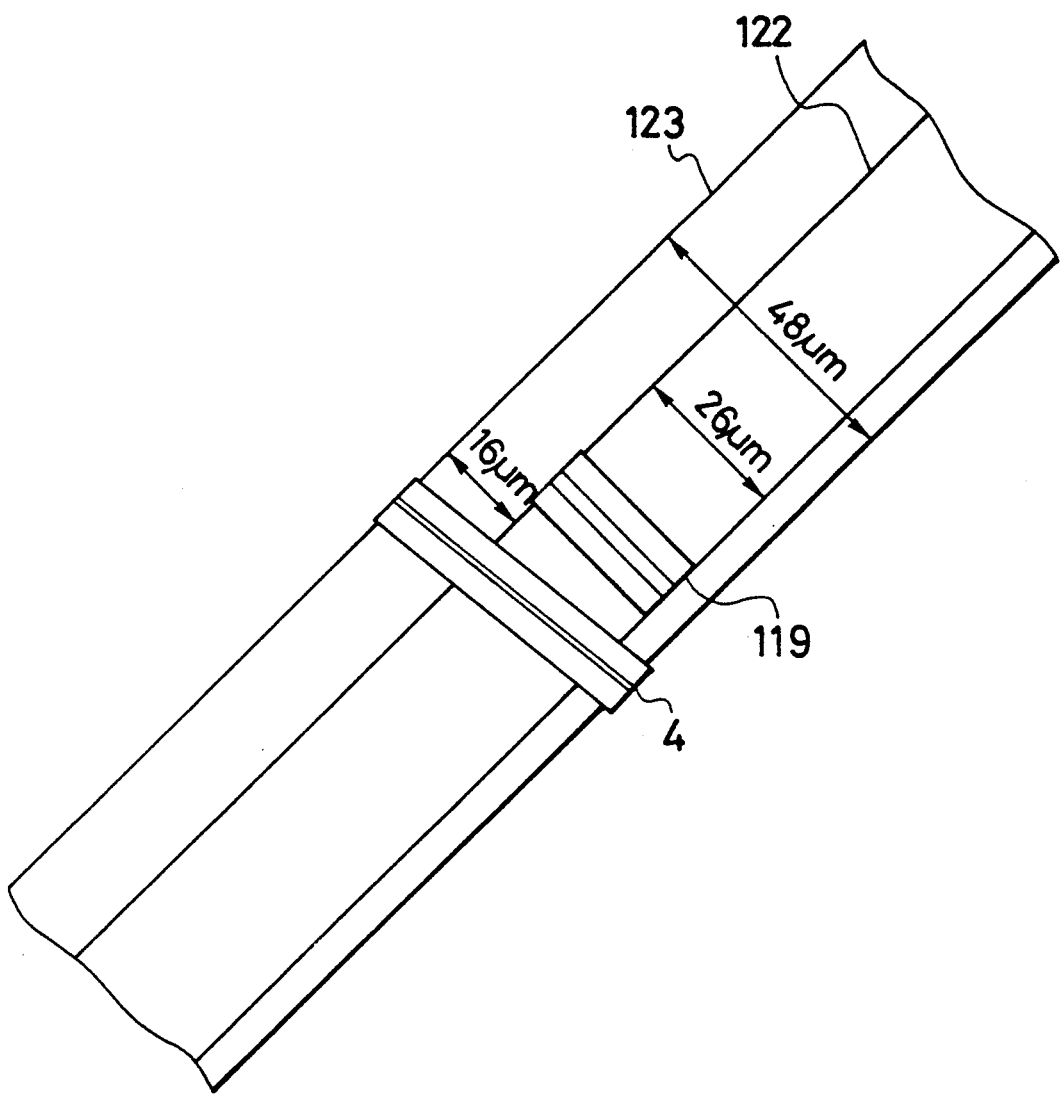
FIG. 12 is a plan view of a hi-fi audio-video tape, illustrating audio and video tracks

With reference to the plan view of the magnetic tape in FIG. 12, the video heads 4 are wider than the audio heads 119 and the heads are aligned so that the second (audio) tracks 122 are disposed within the first (video) tracks 123. In a machine in which the video head and track widths are equal, for example, the video heads 4 may be 48 $\mu$m wide, while the audio heads 119 are 26 $\mu$m wide and are offset by 16 $\mu$m with respect to the video heads 4, causing a similar offset between the edges of the audio and video tracks. (Although the VHS standard specifies a video track width of 58 $\mu$m, in practice video cassette recorders are built for a variety of narrower track widths.)

Figure 13:
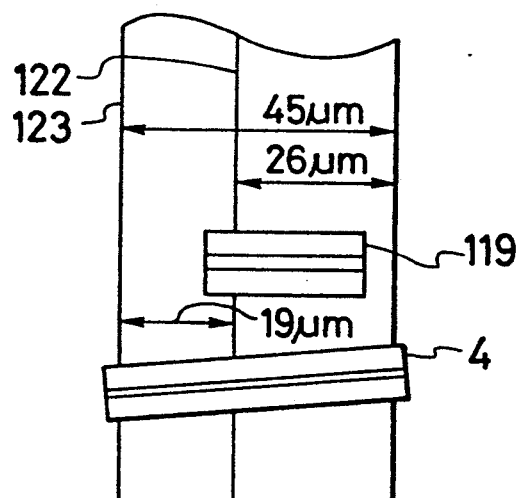
FIGS. 13A-13C are plan views of hi-fi audio-video, illustrating various tracking positions.
Figure 13:
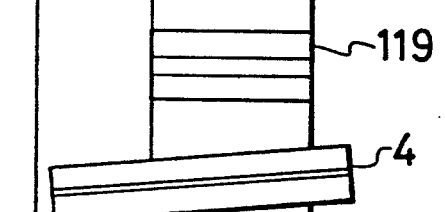
Figure 13:
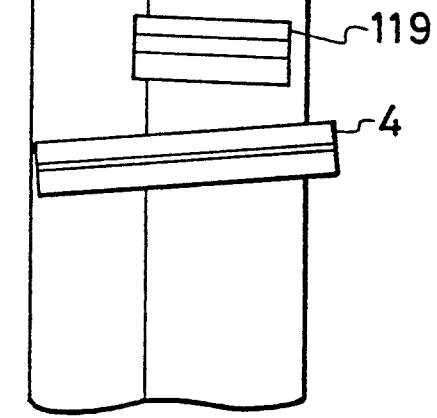

Due to variations in head width and alignment in different machines, when a tape that was recorded on another machine is played back, the relative positions of the audio and video tracks may not match the relative positions of the audio and video heads. FIG. 13, for example, shows a tape recorded with 26 $\mu$m audio tracks 122, 45 μm video tracks 123, and a 19 μm offset between audio and video tracks being scanned by a video cassette recorder having a 16 μm offset between audio heads 119 and video heads 4. At the optimum tracking position for the video signal, shown at A, the audio signal is inadequately reproduced, while at the optimum tracking position for the audio signal, shown at B, the video signal is inadequately reproduced. In such cases the best tracking position overall is an intermediate tracking position such as the one shown at C.

Figure 14B:
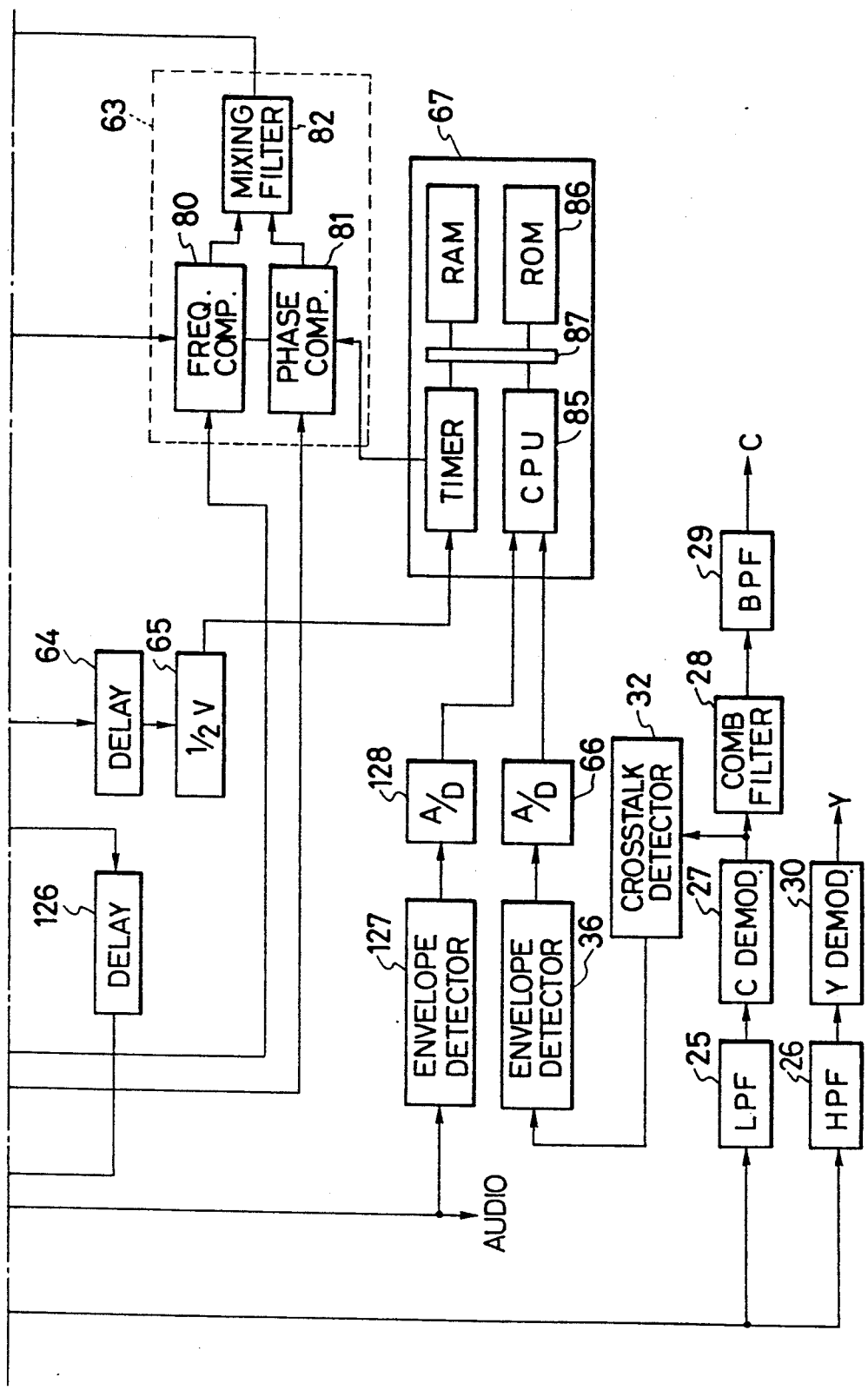

FIG. 14 shows an automatic tracking control system that is capable of optimally tracking both hi-fi and non-hi-fi tapes. This automatic tracking control system is identical to the one in FIG. 5 except that its rotary drum 118 has both video heads 4 and audio heads 119, and it comprises the following additional elements: an audio head amplifier 125 for amplifying the signal picked up by the audio heads 119; a delay line 126 for delaying the video head-switching signal from the drum flip-flop 75 by 90° in phase, thereby generating an audio head-switching signal that controls the audio head amplifier 125; a second envelope detector 127 for detecting the envelope of the audio signal from the audio head amplifier 125, thereby generating a second envelope signal; and a second A/D converter 128 for converting the second envelope signal to a digital signal for input to the microcomputer 67.

For clarity, the crosstalk envelope detector 36 and A/D converter 66 will be referred to respectively as the first envelope detector and first A/D converter.

The microcomputer 67 receives two digitized envelope signals: a first envelope signal from the first A/D converter 66, comprising the video crosstalk envelope; and a second envelope signal from the second A/D converter 128, comprising the audio envelope. Let $L_V$ represent the digitized video crosstalk envelope value obtained from the first A/D converter 66 and $L_A$ represent the digitized audio envelope value obtained from the second A/D converter 128. The object is to minimize $L_V$ while maximizing $L_A$, which is equivalent to maximizing the difference $L_A - L_V$, or minimizing the negative of this difference $L_V - L_A$. Upon receiving $L_V$ and $L_A$, the microcomputer 67 accordingly calculates the difference value $$L = L_V - L_A$$

and follows a search algorithm such as the one in FIG. 7. When a hi-fi audio-video tape is played back, this results in the best compromise between optimum tracking for the audio signal and optimum tracking for the video signal. When a non-hi-fi tape is played back, there is no audio signal for the audio heads 119 to reproduce, the audio signal being recorded, for example, in a separate track parallel to the edge of the tape and reproduced by a stationary audio head not shown in the drawings. Thus $L_A = 0$ and this automatic tracking control system operates in the same way as the one in FIG. 5, optimizing the video tracking.

If necessary, the relative importance of audio and video tracking can be adjusted by multiplying $L_A$ by a weighting factor W before subtracting it from $L_V$, so that:

$$L = L_V - W \cdot L_A.$$

To eliminate noise from the audio heads 119 when a non-hi-fi tape is played back, the program executed by the microcomputer 67 preferably includes a routine that tests the input from the A/D converter 128, detects presence or absence of a hi-fi audio signal, and switches off the input from the A/D converter 128 when no hi-fi audio signal is present.

Figure 15:
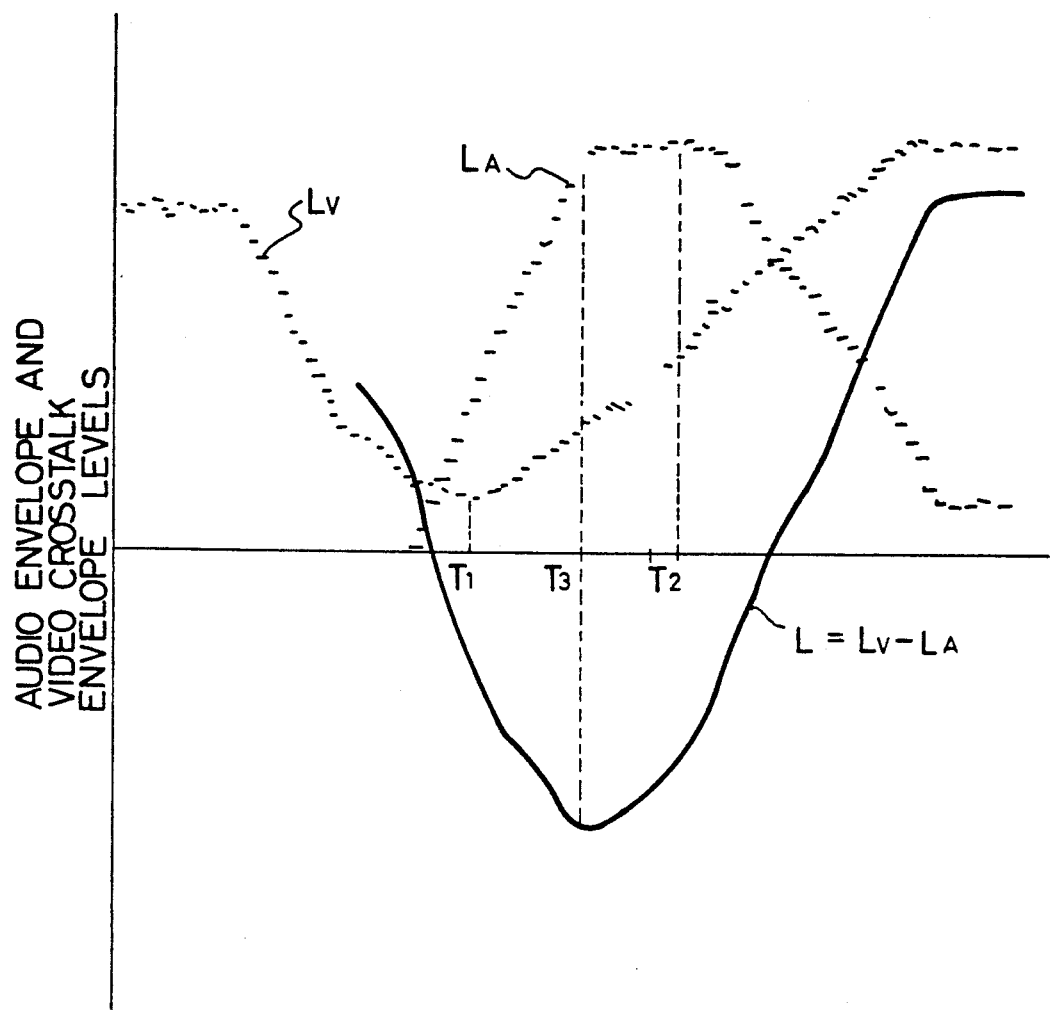
FIG. 15 is a tracking characteristic plot illustrating the performance of the automatic tracking control system in FIG. 14.

FIG. 15 shows an example of the performance of the digital automatic tracking control system in FIG. 14. The horizontal axis represents the tracking phase, and the vertical axis represents the audio envelope and video crosstalk envelope values. The optimum video tracking phase $T_1$ would be unacceptably bad for the audio signal, while the optimum audio tracking phase $T_2$ would be far from optimum for the video signal. By setting the tracking phase at $T_3$ near the minimum value of the $L = L_V - L_A$ curve, the automatic tracking control system achieves near-optimum audio tracking, and the best video tracking consistent with therewith.

By detecting and substantially minimizing adjacent-track crosstalk, the automatic tracking control systems described above avoid confusion between crosstalk and the intended signal, enabling automatic tracking to be used even in VCRs with wide video heads, and yielding a good signal-to-noise ratio.

Although the automatic tracking control systems described above are designed for video tape apparatus, this invention is adaptable to other types of apparatus in which adjacent-track crosstalk occurs, including magnetic disk and optical disk apparatus. The scope of this invention is moreover not restricted to the structures described above, but includes many modifications and variations which will be apparent to one skilled in the art, including but not limited to the following:

In FIG. 1, an inverting amplifier can be inserted after the envelope detector 36, enabling a peak hold circuit to be used instead of the minimum peak hold circuit 41.

The output of the envelope detector 36 can be supplied to the integrator 45 to control the integration time constant, so that the tracking control signal varies more or less rapidly according to whether the crosstalk signal is large or small.

In FIGS. 5 and 14, if the microcomputer 67 has a built-in A/D converter, this can be used instead of the external A/D converters 66 and 128.

If the microcomputer 67 does not have a built-in timer 83, then a timer can be implemented in software, or an external timer can be used. If the microcomputer 67 does not have sufficient built-in random access memory or read-only memory, then external memory can be used.

The tracking control signal generated by the microcomputer 67 may comprise not only the pulses shown at D in FIG. 6 but also pulses gating the ramp in the signal shown at E in FIG. 6.

In FIGS. 1, 5, and 14, the crosstalk detector 32 can receive the modulated signal from the video head amplifier 13 or low-pass filter 25 instead of the demodulated signal from the chroma demodulator 27.

The analog automatic tracking control system in FIG. 1 can be modified for use in a hi-fi VTR or VCR by adding an audio head amplifier, a second envelope detector for the audio signal, and an operational amplifier for inverting the audio envelope and adding the inverted audio envelope to the crosstalk envelope.

Various well-known drum and capstan servos other than those shown in FIGS. 1, 5, and 14 can be employed.

What is claimed is:

1. An automatic tracking system for an apparatus having at least one pickup head for reproducing signals recorded on a plurality of mutually adjacent tracks, comprising:

servo loop means, responsive to a tracking control signal, for controlling the position of said pickup head with respect to said tracks;

crosstalk detecting means for extracting adjacent-track crosstalk from an input signal reproduced by said pickup head, thereby generating a crosstalk signal;

crosstalk envelope detecting means for detecting an envelope of said crosstalk signal, thereby generating a crosstalk envelope signal; and automatic tracking control means for receiving said crosstalk envelope signal, varying said tracking control signal, finding a state of said tracking control signal that minimizes said crosstalk envelope signal, and maintaining said tracking control signal substantially at said state;

wherein said automatic tracking control means varies said tracking control signal in one direction until said crosstalk envelope signal attains a minimum value, and thereafter varies said tracking control signal in a reverse direction when said crosstalk envelope signal exceeds a certain threshold relative to said minimum value.

2. The automatic tracking control system of claim 1, said crosstalk detecting means including, a delay line for delaying said input signal, thereby generating a delayed signal, and a subtractor for subtracting said delayed signal from said input signal.

3. The automatic tracking control system of claim 2, wherein said signals recorded on said mutually adjacent tracks are video signals, and said delay line delays said input signal by one horizontal scanning cycle.

4. The automatic tracking control system of claim 3, wherein said video signals include a downshifted chrominance component, said automatic tracking control system further comprising:

chrominance demodulating means for demodulating said chrominance component and providing the demodulated chrominance component as said input signal to said crosstalk detecting means.

5. The automatic tracking control system of claim 1, wherein said automatic tracking control means includes:

a minimum peak hold circuit for receiving said crosstalk envelope signal and holding the minimum value thereof, thus generating a minimum peak signal;

a comparator for receiving said crosstalk envelope signal and said minimum peak signal, comparing the difference therebetween with said threshold, and generating an output at one level when said difference between is less than said threshold and another level when said difference exceeds said threshold;

a differentiator for differentiating said output of said comparator, thereby generating pulses of positive and negative polarity;

a flip-flop, triggered by pulses of one and only one polarity generated by said differentiator, for generating an output signal with a polarity that reverses when the flip-flop is triggered; and an integrator for integrating said output signal of said flip-flop, thereby generating said tracking control signal.

6. The automatic tracking control system of claim 1, wherein said pickup head is rotationally driven, said tracks are recorded on a tape, and said servo loop means includes:

a control head for picking up a control signal representative of the positions of said tracks;

a pulse generator for generating pulses representative of the rotational position of said pickup head;

a tracking delay circuit for delaying said pulses by an amount responsive to said tracking control signal, thereby generating delayed pulses;

a phase comparator for comparing the phase of said control signal with the phase of said delayed pulses and generating an error signal representative of the difference therebetween; and a motor for transporting said tape at a speed responsive to said error signal.

7. An automatic tracking system for an apparatus having at least one pickup head for reproducing signals recorded on a plurality of mutually adjacent tracks, comprising:

servo loop means, responsive to a tracking control signal, for controlling the position of said pickup head with respect to said tracks;

crosstalk detecting means for extracting adjacent-track crosstalk from an input signal reproduced by said pickup head, thereby generating a crosstalk signal;

crosstalk envelope detecting means for detecting an envelope of said crosstalk signal, thereby generating a crosstalk envelope signal; and automatic tracking control means for receiving said crosstalk envelope signal, varying said tracking control signal, finding a state of said tracking control signal that minimizes said crosstalk envelope signal, and maintaining said tracking control signal substantially at said state;

wherein said tracking control signal is a pulse signal and said automatic tracking control means varies a phase of said tracking control signal, finds a target tracking phase that substantially minimizes said crosstalk envelope signal, and continues to generate said tracking control signal at said target tracking phase;

wherein said automatic control means includes, an A/D converter for converting said crosstalk envelope signal to a digital envelope signal, and a microcomputer for receiving said digital envelope signal, executing a search algorithm to find said target tracking phase, and generating said tracking control signal at said target tracking phase, wherein said microcomputer includes, a timer for generating said tracking control signal at a phase controlled by a tracking phase parameter;

a central processing unit for calculating threshold values by adding a tolerance value to values of said digital envelope signal, finding setting values by comparing values of said digital envelope signal with said threshold values, calculating said target tracking phase from said setting values, and setting said tracking phase parameter to said target tracking phase, and a random access memory for storing said threshold values and said setting values.

8. The automatic tracking control system of claim 7, wherein said pickup head is rotationally driven and said automatic tracking control means varies the phase of said tracking control signal in relation to the phase of a signal representing the rotational position of said pickup head.

9. The automatic tracking control system of claim 7, wherein said tracks are recorded on a tape and said servo loop means includes:
   a control head for picking up a control signal representative of the positions of said tracks;
   a phase comparator for comparing the phase of said control signal with the phase of said tracking control signal and generating an error signal representative of the difference therebetween; and
   a motor for transporting said tape at a speed responsive to said error signal.

10. The automatic tracking control system of claim 7, wherein said microcomputer varies the phase of said tracking control signal in one direction, finds one said setting value, then varies the phase of said tracking control signal in the opposite direction and finds another said setting value.

11. The automatic tracking control system of claim 10, wherein said microcomputer calculates said target tracking phase as the midpoint between said setting values.

12. An automatic tracking control system for an apparatus having at least one pickup head for reproducing signals recorded on a plurality of mutually adjacent first tracks and at least one pickup head for reproducing signals recorded on a plurality of second tracks, comprising:
   a servo loop, responsive to a tracking control signal, for controlling the position of said pickup heads with respect to said first tracks and second tracks;
   a crosstalk detector for extracting adjacent-track crosstalk from a first input signal reproduced from said first tracks, thereby generating a crosstalk signal;
   a first envelope detector for detecting an envelope of said crosstalk signal, thereby generating a first envelope signal;
   a second envelope detector for detecting an envelope of a second input signal reproduced from said second tracks, thereby generating a second envelope signal; and
   an automatic tracking control circuit for subtracting said second envelope signal from said first envelope signal to obtain a difference value, varying said tracking control signal, finding a state of said tracking control signal that minimizes said difference value, and maintaining said tracking control signal substantially at said state.

13. The automatic tracking control system of claim 12, wherein said automatic tracking control circuit multiplies said second envelope signal by a weighting factor before subtracting said second envelope signal from said first envelope signal.

14. The automatic tracking control system of claim 12, wherein said signals recorded in said first tracks are video signals, and said signals recorded in said second tracks are audio signals.

15. The automatic tracking control system of claim 14, wherein said crosstalk detector includes,
   a delay line for delaying said first input signal by one horizontal scanning cycle, thereby generating a delayed signal, and
   a subtractor for subtracting said delayed signal from said first input signal.

16. The automatic tracking control system of claim 14, wherein said video signals have a down-shifted chrominance component, said automatic tracking control system further comprising:
   a chrominance demodulator for demodulating said chrominance component and providing the demodulated chrominance component as said first input signal to said crosstalk detector.

17. The automatic tracking control system of claim 12, wherein said tracking control signal is a pulse signal, and said automatic tracking control circuit includes,
   a first A/D converter for converting said first envelope signal to a first digital envelope signal,
   a second A/D converter for converting said second envelope signal to a second digital envelope signal, and
   a microcomputer for subtracting said second digital envelope signal from said first digital envelope signal to obtain said difference value, searching for a target tracking phase of said tracking control signal that minimizes said difference value, and generating said tracking control signal at said target tracking phase.

18. The automatic tracking control system of claim 17, wherein said microcomputer includes,
   a timer for generating said tracking control signal at a phase controlled by a tracking phase parameter;
   a central processing unit for calculating threshold values by adding a tolerance value to said difference value, finding setting values by comparing said difference value with said threshold values, calculating said target tracking phase from said setting values, and setting said tracking phase parameter to said target tracking phase; and
   a random access memory for storing said threshold values and said setting values.

19. The automatic tracking control system of claim 18, wherein said microcomputer varies the phase of said tracking control signal in one direction, finds one said setting value, then varies the phase of said tracking control signal in the opposite direction and finds another said setting value.

20. The automatic tracking control system of claim 19, wherein said microcomputer calculates said target tracking phase as the midpoint between said setting values.

21. An automatic tracking control system for an apparatus for reproducing signals, comprising:
   servo loop means responding to a tracking control signal, for controlling a position of a pickup head on a plurality of adjacent tracks;
   crosstalk detecting means for extracting crosstalk from an input signal reproduced by the pickup head and for generating a crosstalk signal;
   crosstalk envelope detection means for detecting an envelope of the crosstalk signal and for generating a crosstalk envelope signal; and
   automatic tracking control means for utilizing values of the crosstalk envelope signal as the tracking control signal for said servo loop, said automatic tracking control means generating an initial minimum value of the crosstalk envelope signal, such that said servo loop means moves the pickup head in one direction until the initial minimum value is reached;

said servo loop means continuing to move the pickup head in said one direction until an absolute minimum value of the crosstalk envelope signal is generated by said automatic tracking control means, the absolute minimum value of the crosstalk envelope representing an optimum tracking position for the pickup head;

said servo loop means further moving the pickup head in an opposite direction until a value of the crosstalk envelope signal is generated by said automatic tracking control means which equals a predetermined threshold value relative to the absolute minimum value of the crosstalk envelope signal;

said automatic tracking control means maintaining the value of the crosstalk envelope signal between the predetermined threshold value and the absolute minimum value.

22. The automatic tracking control system of claim 21, said crosstalk detecting means including,
- a delay line for delaying said input signal, thereby generating a delayed signal, and
- a subtractor for subtracting said delayed signal from said input signal.

23. The automatic tracking control system of claim 22, wherein the reproduced signals are video signals, and said delay line delays said input signal by one horizontal scanning cycle.

24. The automatic tracking control system of claim 23, wherein the video signals include a down-shifted chrominance component, said automatic tracking control system further comprising:
- a chrominance demodulator for demodulating said chrominance component, and providing the demodulated chrominance component as the input signal to said crosstalk detecting means.

25. The automatic tracking control system of claim 21, wherein said automatic tracking control means includes,
- a minimum peak hold circuit for receiving the crosstalk envelope signal and holding the initial minimum value and for generating a minimum peak signal,
- a comparator for receiving the crosstalk envelope signal and the minimum peak signal, comparing the difference therebwetween with the predetermined threshold value, and generating an output at one level when the difference between is less than the predetermined threshold value and another level when the difference exceeds the predetermined threshold value,
- a differentiator for differentiating the output of said comparator, thereby generating pulses of positive and negative polarity,
- a flip-flop, triggered by pulses of one and only one polarity generated by said differentiator, for generating an output signal with a polarity that reverses when the flip-flop is triggered, and
- an integrator for integrating the output signal of said flip-flop, thereby generating the tracking control signal.

26. The automatic tracking control system of claim 21, wherein the pickup head is rotationally driven, the plurality of adjacent tracks are recorded on a tape, and said servo loop means includes,
- a control head for picking up a control signal representative of the positions of the plurality of adjacent tracks;
- a pulse generator for generating pulses representative of the rotational position of the pickup head;
- a tracking delay circuit for delaying the pulses by an amount responsive to the tracking control signal, thereby generating delayed pulses;
- a phase comparator for comparing the phase of the control signal with the phase of the delayed pulses and generating an error signal representative of the difference therebetween; and
- a motor for advancing the tape at a speed responsive to the error signal.

27. The automatic tracking control system of claim 21, wherein the tracking control signal is a pulse signal and said automatic tracking control means varies the phase of said tracking control signal, finds a target tracking phase that substantially minimizes the crosstalk envelope signal, and continues to generate the tracking control signal at the target tracking phase.

28. The automatic tracking control system of claim 27, wherein the pickup head is rotationally driven and said automatic tracking control means varies the phase of the tracking control signal in relation to the phase of a signal representing the rotational position of the pickup head.

29. The automatic tracking control system of claim 27, wherein the plurality of adjacent tracks are recorded on a tape and said servo means loop includes,
- a control head for picking up a control signal representative of the positions of the plurality of adjacent tracks;
- a phase comparator for comparing the phase of the control signal with the phase of the tracking control signal and generating an error signal representative of the difference therebetween; and
- a motor for advancing the tape at a speed responsive to the error signal.

30. The automatic tracking control system of claim 27, wherein said automatic control means includes,
- an A/D converter for converting the crosstalk envelope signal to a digital envelope signal; and
- a microcomputer for receiving said digital envelope signal, searching for the target tracking phase, and generating the tracking control signal at the target tracking phase.

31. The automatic tracking control system of 30, wherein said microcomputer includes,
- a timer for generating the tracking control signal at a phase controlled by a tracking phase parameter;
- a central processing unit for calculating threshold values by adding a tolerance value to values of the digital envelope signal, finding setting values by comparing values of the digital envelope signal with the threshold values, calculating the target tracking phase from the setting values, and setting the tracking phase parameter to the target tracking phase; and
- a random access memory for storing the threshold values and the setting values.

32. The automatic tracking control system of claim 31, wherein said microcomputer varies the phase of the tracking control signal in one direction, finds one of the setting values, then varies the phase of the tracking control signal in the opposite direction and finds another of the setting values.

33. The automatic tracking control system of claim 32, wherein said microcomputer calculates the target tracking phase as the midpoint between the setting values.

34. An automatic tracking control system for an apparatus having at least one pickup head for reproducing signals recorded on a plurality of mutually adjacent tracks, comprising:
- a servo loop, responsive to a tracking control signal, for controlling the position of said pickup head with respect to said tracks;
- a crosstalk detector for extracting adjacent-track crosstalk from an input signal reproduced by said pickup head, thereby generating a crosstalk signal;
- a crosstalk envelope detector for detecting an envelope of said crosstalk signal, thereby generating a crosstalk envelope signal; and
- an automatic tracking control circuit including,
  - a minimum peak hold circuit for receiving said crosstalk envelope signal and holding the minimum value thereof, thus generating a minimum peak signal,
  - a comparator for receiving said crosstalk envelope signal and said minimum peak signal, comparing the difference therebetween with a threshold, and generating an output at one level when said difference is less than said threshold and another level when said difference exceeds said threshold, and
  - tracking control signal generating means responsive to the output of said comparator for generating the tracking control signal such that said difference detected by said comparator is maintained less than said threshold.

35. The automatic tracking control system of claim 34, wherein said automatic tracking control circuit varies said tracking control signal in one direction until said crosstalk envelope signal attains said minimum value, and thereafter varies said tracking control signal in a reverse direction when said crosstalk envelope signal crosses said threshold.

36. The automatic tracking control system of claim 35, wherein said automatic tracking control circuit further comprises:
- a differentiator for differentiating said output of said comparator, thereby generating pulses of positive and negative polarity;
- a flip-flop, triggered by pulses of one and only one polarity generated by said differentiator, for generating an output signal with a polarity that reverses when the flip-flop is triggered; and
- an integrator for integrating said output signal of said flip-flop, thereby generating said tracking control signal.

* * * * *